(12) United States Patent
Colasante

(10) Patent No.: US 8,967,965 B1
(45) Date of Patent: Mar. 3, 2015

(54) APPARATUS AND METHOD FOR ORTHOSONIC LIFT BY DEFLECTION

(71) Applicant: David A Colasante, Newtown Square, PA (US)

(72) Inventor: David A Colasante, Newtown Square, PA (US)

( * ) Notice: Subject to any disclaimer, the term of this patent is extended or adjusted under 35 U.S.C. 154(b) by 0 days.

(21) Appl. No.: 14/194,761

(22) Filed: Mar. 2, 2014

(51) Int. Cl.
*A47J 45/00* (2006.01)
*F01D 5/12* (2006.01)
*G10K 9/122* (2006.01)
*G10K 15/00* (2006.01)

(52) U.S. Cl.
CPC *F01D 5/12* (2013.01); *G10K 9/122* (2013.01); *G10K 15/00* (2013.01)
USPC ............................ 416/1; 294/64.3; 294/185

(58) Field of Classification Search
USPC ........................................................ 294/64.3
See application file for complete search history.

(56) References Cited

U.S. PATENT DOCUMENTS

| | | | | |
|---|---|---|---|---|
| 5,006,749 | A * | 4/1991 | White | 310/323.03 |
| 6,638,004 | B2 * | 10/2003 | Berger et al. | 414/800 |
| 7,168,747 | B2 * | 1/2007 | Hoehn et al. | 294/64.3 |
| 7,870,946 | B2 * | 1/2011 | Zimmermann et al. | 198/630 |
| 8,225,924 | B2 * | 7/2012 | Isobe | 198/752.1 |
| 2012/0119528 | A1 * | 5/2012 | Herfert | 294/65 |

OTHER PUBLICATIONS

David Colasante, Youtube Video "AC & DC Lift of a Flat Wing" Published Oct. 24, 2012. Screenshots provided.*

* cited by examiner

*Primary Examiner* — Dwayne J White
*Assistant Examiner* — Justin Seabe
(74) *Attorney, Agent, or Firm* — Lipton, Weinberger & Husick; Robert J. Yarbrough

(57) ABSTRACT

An apparatus and method for providing orthosonic lift by deflection includes a support surface and a wing surface in close proximity to the support surface. The space between the support surface and the wing surface defines a volume of air. An orthosonic lift generator causes the oscillating movement of air in the volume parallel to the wing surface. The oscillating movement of air results in a static air pressure on the wing surface of less than the ambient air pressure, resulting in a net force acting on the wing member.

7 Claims, 20 Drawing Sheets

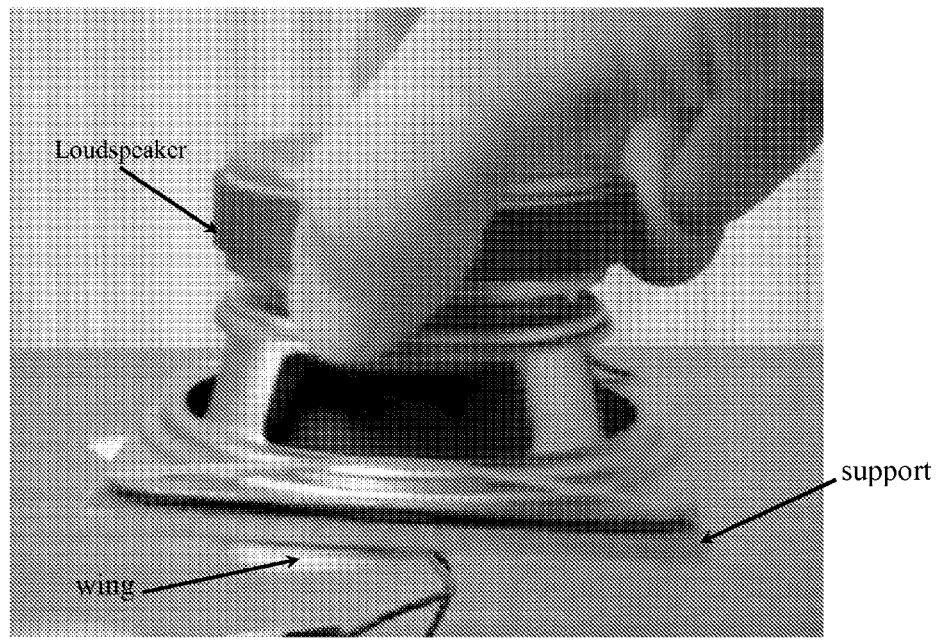
Fig. 1 to Colasante Declaration, still from the Colasante NPL YouTube Video
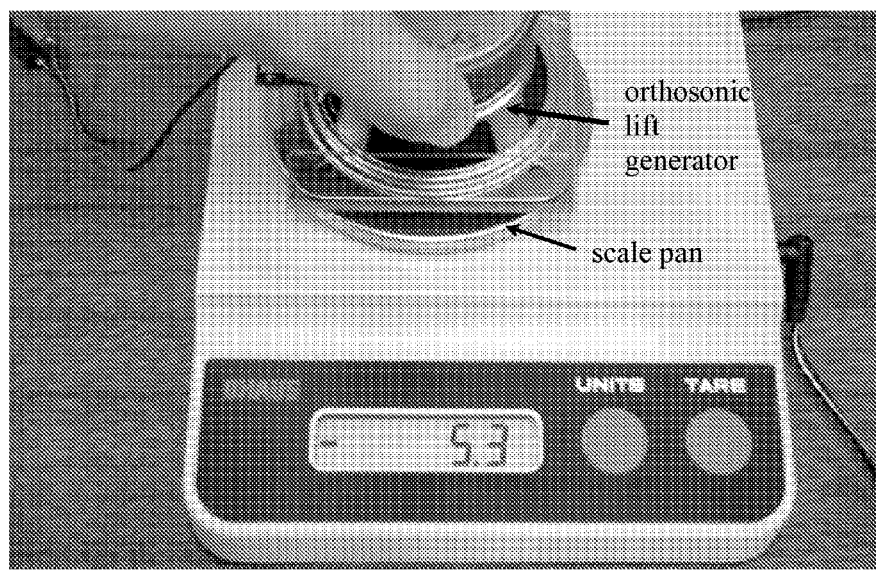
Fig. 2 to Colasante Declaration, Maximum lift from the apparatus of the Colasante NPL YouTube Video

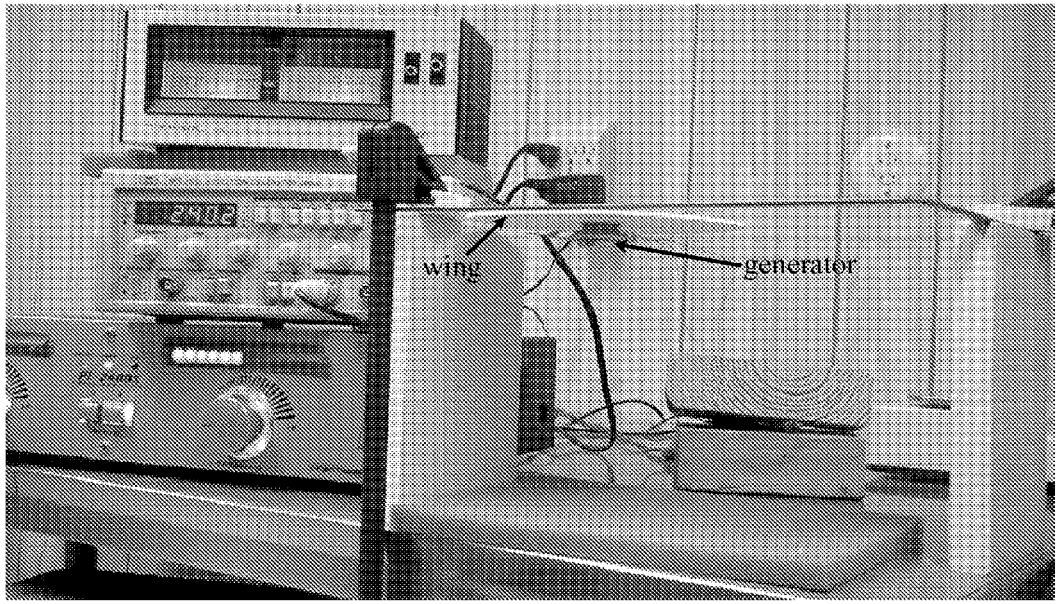
Fig. 3 to Colasante Declaration - First demonstration - wing and generator combination supported from a glass sheet by orthosonic lift
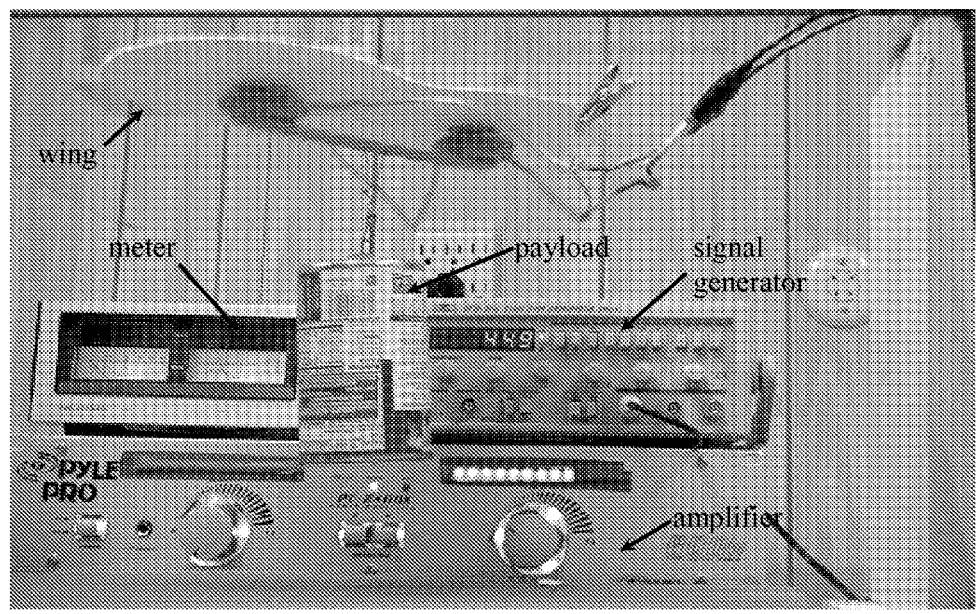
Fig. 4 to Colasante Declaration - Second demonstration - wing and array of two orthosonic generators support a payload, which is a full can of soup, from a glass sheet by orthosonic lift.

APPARATUS AND METHOD FOR ORTHOSONIC LIFT BY DEFLECTION

I. BACKGROUND OF THE INVENTION

A. Field of the Invention

The invention is an apparatus and method for applying force to an object orthogonal to the direction of an oscillating movement of air. As used in this document, the term 'oscillating' means that the air moves in a first direction followed by movement of the air in the opposite direction. A sound wave is an example of oscillating air. As used in this document, the term 'orthosonic' means perpendicular to the direction of the oscillating movement of air. For a propagating sound wave, the term 'orthosonic' means perpendicular to the direction of propagation of the sound wave. As used in this document, the term 'air' means atmospheric air and also means any gas or liquid.

B. Description of the Related Art

Aerodynamic lift is generated by movement of air with respect to a surface due to the well-known Bernoulli principle. According to the Bernoulli principle, the difference in static pressure, transverse to the direction of flow of air at two locations, is proportional to the difference in the squares of the velocity of the air at the two locations. A necessary corollary to the Bernoulli principle is that the air motion important to affect the static pressure at a surface is relative air motion between the surface and the air—either the air, the surface or both can be moving. Also, the location of the moving air that affects the static pressure at the surface is in the boundary layer immediately adjacent to the surface, since only air molecules that come in contact with the surface can apply pressure to the surface. Finally, the relation between velocity and static pressure is instantaneous. A change in velocity instantly causes a change in static pressure.

From the Bernoulli principle and all other things being equal, the faster the movement of air in the boundary layer parallel to the surface, the lower the static pressure exerted by the air against the surface.

In a prior art wing, air moves in only one direction, from the leading edge of the wing to the trailing edge. In the case of an aircraft wing, air is moving faster adjacent to the top surface of the wing than adjacent to the bottom surface of the wing. The air exerts a lower static pressure on the wing top surface than on the wing bottom surface. The difference in the static pressure on the wing top surface and the wing bottom surface results in lift.

The nature of fluid flow affects the operation of a conventional wing; namely, turbulence and drag. The flow of air beyond a critical distance or for longer than a critical time results in the flow becoming turbulent. Turbulent flow is chaotic and results in loss of lift and higher drag and subsequently increased power to maintain the velocity of the air with respect to the wing. In a conventional wing with air flow in only one direction, turbulence is unavoidable because the critical distance and time are exceeded by the one-way flow of air.

A 'Bernoulli grip' is a specialized case of a conventional wing. In a Bernoulli grip, air flows from an orifice on a gripping member. When the gripping member is moved into close proximity to the surface of an object, the air flowing from the gripping member moves radially away from the orifice between the surface of the object and a corresponding gripping member surface. The air is exhausted at the edges of the corresponding surfaces of the gripping member and object. From the Bernoulli principle, the velocity of the air as it moves across the gripping member causes the static pressure between the surfaces of the object and the gripping member to be reduced proportional to the square of the air velocity. The side of the object opposite to the gripping member experiences an air velocity of zero and the static pressure is the same as the ambient air pressure. The net force due to the differences in air pressure acting on the object urges the object toward the gripping member. The lifting power of the Bernoulli grip is reduced because the discharge of air from the orifice causes a local increase in air pressure in the vicinity of the nozzle due to the momentum of the moving air against the surface of the object, which reduces the net force urging the object toward the gripping member.

The prior art does not teach the apparatus or method of the invention.

II. SUMMARY OF THE INVENTION

The Invention is an apparatus and method for deriving orthosonic force from the oscillating movement of air. An oscillating movement of air, such as a sound wave, is also referred to in this document as alternating current or 'AC' air movement. A non-alternating flow of air in a single direction is referred to in this document as a direct current or 'DC' air flow. The Inventor recognized that a reduction in static pressure, consistent with the Bernoulli principle, is generated not only from the DC air flow in one direction along a surface, as in a conventional aircraft wing, but also from the movement of air in any direction, including AC movement of air along the surface. The Invention stems from that insight.

A. Orthosonic Lift

For the apparatus of the invention, a support member has a support surface and a wing member has a wing surface. The support and wing surfaces are in close proximity one to the other. An oscillating movement of air induced between the two members and parallel to the two surfaces causes the static pressure of the air acting on the two surfaces to be reduced compared to ambient air pressure. Ambient air pressure acts on the other side of both members. Since the static pressure between the two surfaces is less than the ambient pressure, the net air pressure acting on the two members urges the two members one toward the other.

In a first flying wing embodiment of the Invention, the support member is in a fixed location. The support surface of the support member generally is flat and oriented orthogonal to the direction of the force of gravity, with the support surface facing down. The wing surface is generally flat and is facing up but is not in a fixed location with respect to the support surface. When the support and wing surfaces are placed in close proximity and oscillating air movement is induced between the two surfaces by an orthosonic lift generator, discussed below, the pressure differential across the wing member will urge the wing member vertically toward the support member. If the oscillating air movement is sufficiently energetic and if the corresponding areas of the support and wing surfaces are sufficiently large, the pressure differential across the wing member will generate sufficient orthosonic lift to support the mass of the wing member and a payload against the pull of gravity, maintaining the wing surface in close proximity to the support surface.

For the first flying wing embodiment, the wing member flies in the same manner that a conventional aircraft flies—the air pressure differential acting across the wing member lifts the wing member. The wing member differs from a conventional aircraft wing in that (a) the wing member is not required to move through the air to generate lift, (b) no net movement of air across the wing is required to generate lift, and (c) orthosonic lift derives from oscillating movement of air across the top surface of the wing combined with no air motion across the bottom surface of the wing.

For the flying wing application described above, the engagement of the support surface and wing surface is a very low-friction engagement. The support and wing surfaces are separated by a thin layer of oscillating air and may not physically touch. The air oscillates parallel to the support and wing surfaces and acts as an air bearing. Like a conventional air bearing, the flying wing application exhibits a very low friction. Unlike a conventional air bearing, there is little or no net movement of air between the bearing surfaces. The apparatus may experience little or no turbulence, and hence very little drag, because the movement of the air may occur for only a brief period of time and over a short distance—the time and distance of the air movement can be much less than the critical time and distance for turbulent flow. The low turbulence and hence low drag results in very low resistance to movement in the engagement between the support and wing members. Effectively, the only resistance to movement of the wing member is the air resistance presented by the ambient air as the moving wing member pushes the ambient air aside. As a result, the wing member may be moved with very little force.

The close proximity of the support and wing surfaces is maintained by a self-regulating feedback mechanism. If the wing surface approaches too closely to the support surface, the proximity of the support and wing surfaces physically constricts the oscillating air movement between those surfaces. Because of the constriction, the oscillating movement of air in the volume between the two surfaces drops. Because the oscillating air movement drops, the static pressure on the wing surface increases. As a result, the mass of the wing member overcomes the diminishing orthosonic lift and the wing member moves away from the support member by a small distance. As the support surface and wing surface separate, the physical constriction is removed, the oscillating movement of air is restored and the net lift on the wing member increases to the point where the net lift overcomes the mass of the wing member and again lifts the wing member. The support and wing surfaces thus will tend to maintain a small separation distance. If the wing member is perturbed from that small separation distance, it will tend to move back to the separation distance at which the orthosonic lift generated by the oscillating air balances the force of gravity acting on the mass of the wing member and payload.

The support and wing surfaces both may be generally flat. If the support and wing surfaces are generally flat, then the wing member may move in any direction in the two-dimensional plane defined by the support surface of the support member. Alternatively, the support surface may define a generally straight line in one direction but not in another. In this event, the generally straight line will define an axis of travel for the wing member and the wing member may move only along the single axis of travel defined by the support surface. The shapes of the support and wing surfaces must correspond to maintain the close proximity of the wing surface and support surface, but curved, corrugated, cylindrical, angled or other corresponding shapes may be used.

As a first example of the flying wing embodiment of the Invention, the support surface may be the ceiling of a casino or airport and the wing member may be a mobile surveillance system capable of moving to any unobstructed location on the ceiling. As a second example of the flying wing embodiment, the support member and support surface may define the route of a light mass transit line. The passenger car of the mass transit line incorporates the wing member and follows the route defined by the support member.

As noted above, the Invention avoids the issues of turbulence and resulting power loss that affect a conventional wing because, for the Invention, the flow of air in any direction can be selected not to exceed the critical time and the critical distance. As a result, the power required to maintain lift is less than that for a conventional wing.

B. Orthosonic Lift Generator

As used in this document, the term 'orthosonic lift generator' means any mechanism to generate an oscillating movement of air between the support and wing surfaces. As a first example, a conventional loudspeaker includes a diaphragm attached to a transducer. The loudspeaker generates an oscillating movement of air when an alternating electrical signal is applied to the transducer. When that oscillating movement of air is confined and directed between the two adjacent surfaces of the two members, the motion of the air first in one direction and then in a second direction opposite to the first direction defines an AC air movement between the two surfaces. The oscillating, AC air movement between the two surfaces causes a static pressure of less than the ambient air pressure between the two surfaces. Orthosonic lift derives from the difference between the reduced static pressure between the adjacent surfaces and the higher ambient air pressure acting on the other side of the wing member.

As an alternative, one or both of the wing surface and the support surface can be configured to vibrate, as by attaching an exciter or piezoelectric material to the wing member or to the support member. An exciter is an electromechanical device similar to a loudspeaker, but lacking the speaker basket and speaker cone. Upon excitation by an alternating current, the exciter or piezoelectric material vibrates, causing the support surface or wing surface to vibrate. Vibration of the support surface or the wing surface generates oscillating movement of air within the space between the support and wing surfaces. In another alternative, one or both of the support and wing surfaces may be composed of the piezoelectric material so that applying an alternating current to the piezoelectric material causes the entire surface to vibrate. Where the wing member is composed of a piezoelectric material, the piezoelectric material also may serve as the structure of the wing member in addition to serving as the orthosonic lift generator.

The orthosonic lift generator may be mechanical, such as a piston reciprocating in a cylinder or a vibrating diaphragm, such as a diaphragm pump. The oscillating movement of air generated by the piston or vibrating diaphragm is confined and directed to the volume between the two adjacent surfaces of the support and wing members.

A mechanical orthosonic lift generator may be a vibrating reed exciting a resonant chamber, such as a clarinet or saxophone reed, located in a duct communicating to the volume between the wing and support surfaces. A small air movement past the reed may cause resonant oscillating movement of air in the volume between the wing and support surfaces. A free reed, such as an accordion reed, may be mounted in communication with the volume between the support and wing surfaces and caused to vibrate by a small air movement or by a periodic application of a magnetic field, as from an electromagnet. The vibration of the reed induces oscillating motion of air within the volume between the support and wing surfaces.

The orthosonic lift generator may be mounted to the wing member and direct the oscillating air movement through the wing surface to the space between the support and wing surfaces. Alternatively, the mechanisms to generate the oscillating movement can be mounted to the support member and direct oscillating movement through the support surface to the space between the support and wing surfaces.

Where the wing member is mobile on the support surface and the orthosonic lift generator is mounted to the support member, the orthosonic lift generators in a particular location can be energized to generate oscillating movement upon the approach of the wing member and can be de-energized to stop the oscillating movement upon the departure of the wing member from that location.

C. Movement of the Wing Member

The very low friction provided by the engagement of the support and wing surfaces allows the wing member to be moved with little more than the force required to overcome aerodynamic drag of the wing member moving through the ambient air. Where the orthosonic lift generator utilizes a magnet or generates a magnetic field, such as the loudspeaker or exciter mounted to the wing member, locomotion magnetic fields may be used to repel or attract the magnetic field of the orthosonic lift generator and hence to move the wing member. Where the orthosonic lift generator does not utilize magnetic fields, such as a piezoelectric orthosonic lift generator, one or more permanent magnets or electromagnets may be attached to the wing member to provide a magnetic field against which a locomotion magnetic field may act. The locomotion magnetic fields may be generated by electromagnets mounted to the support member, which may be activated and deactivated as needed to urge the wing member in a desired direction. Alternatively, a permanent magnet may interact with the magnetic field of the wing member to move the wing member.

Where multiple orthosonic lift generators support the wing member at any one time, control of the amplitude, frequency, phase and complexity of the oscillating air movement from each of the orthosonic lift generators using an electronic controller may selectably rotate and propel the wing member. A controller generates waveforms that are then amplified and supplied to the orthosonic lift generators. The controller may be informed by one or more sensors that detect the condition of the wing member. The sensors may detect parameters such as the location of the wing member on the support member, the separation distance between the wing and support surfaces at one or more locations, the static pressures at one or more locations between the surfaces, ambient conditions, and any other conditions useful to control the wing member. The controller may select the amplitude, frequency, phase and complexity of the signals provided to the orthosonic lift generators, and hence the amplitude, frequency phase and complexity of the oscillating air movement from each orthosonic lift generator, based on a command received by the controller and based on the conditions detected by the sensors.

If the controller receives a command to rotate the wing member, the controller may command a rotating phase among three or more orthosonic lift generators. The rotating phase may create a rotating air movement in the volume between the support and wing surfaces and the result in the counter-rotation of the wing member, thereby turning the wing member.

If the controller receives a command to move in a desired direction, the controller may increase the amplitude of the signal sent to some orthosonic lift generators and reduce the amplitude of the signal sent to others, causing the wing surface to tilt slightly in the desired direction. The slight tilt causes a component of the lift vector to urge the wing member in the desired direction.

Orientation and movement of the wing member also may be effected by any other suitable means, such as by one or more electric motors attached to the wing member and turning propellers or by wheels or continuous treads or tracks engaging the support surface.

The oscillating movement of air between the support and wing surfaces may be of any suitable frequency. The frequency may fall within the audio spectrum and may be perceived as sound, but frequencies outside of the audio spectrum also may be used and operation of the apparatus may be inaudible.

III. BRIEF DESCRIPTION OF THE DRAWINGS

IV. DESCRIPTION OF AN EMBODIMENT

Figure 1:
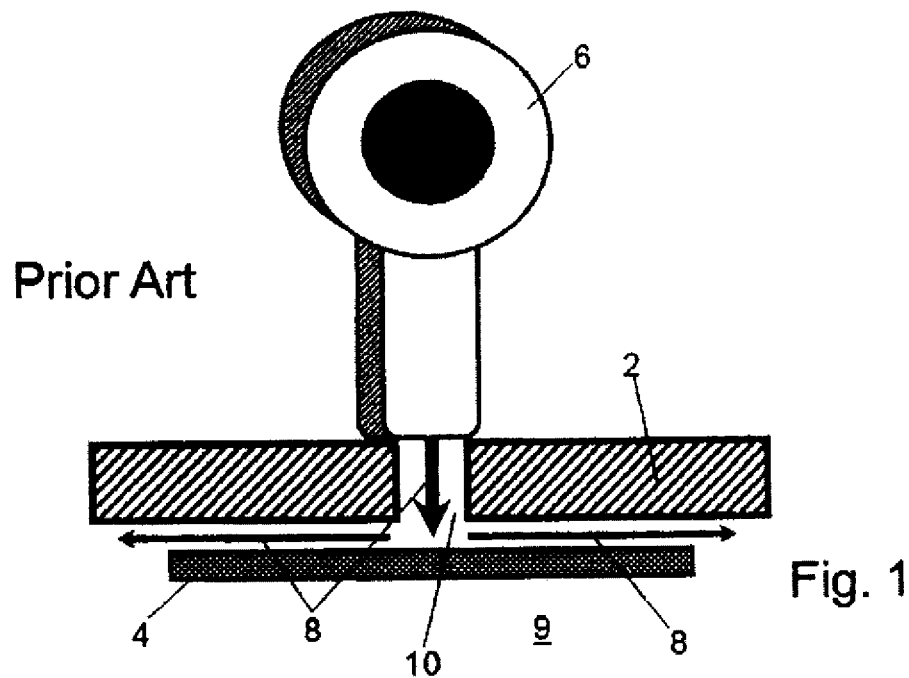
FIG. 1 is a schematic side view of a prior art Bernoulli grip.
Figure 2:
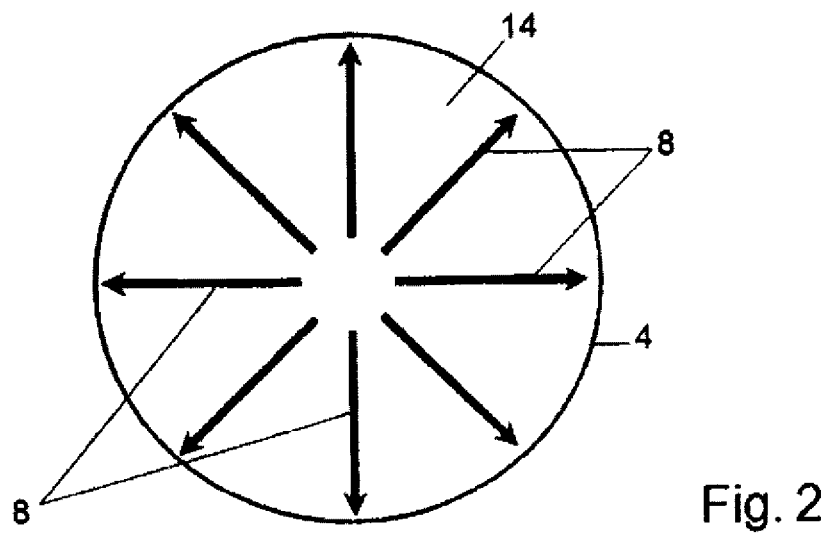
FIG. 2 is a top view of a wing member of the prior art Bernoulli grip.

FIGS. 1 and 2 illustrate a prior art Bernoulli grip utilizing DC air flow. From FIG. 1, the Bernoulli grip has a gripping member 2 used to support a wing member 4. A blower 6 propels air 8 through a port 10 and across the wing surface 14 of the wing member 4. From FIG. 2, the flow of air 8 on the wing surface 14 from the port 10 is radial. The static air pressure 12 on the wing surface 14 is reduced in proportion to the square of the velocity of the air 8, from the Bernoulli principle. Because the ambient air pressure 16 acting on the opposite side 18 of the wing member 4 is greater than the static air pressure 12 acting on the wing surface 14, the wing member 4 experiences a net force urging the wing member 4 toward the gripping member 2.

For the prior art Bernoulli grip of FIGS. 1 and 2, the momentum of the air 8 flowing from the blower 6 increases the local pressure on the wing surface 14 in the vicinity of the port 10, reducing the net air pressure differential across the wing member 4 and reducing the load that may be supported by wing member 4.

The Inventor had the original insight that because the difference in static pressure varies by the difference in the square of the air velocities under the Bernoulli principle, the direction of the movement of the air is unimportant to the resulting static pressure difference. The difference in direction of air flow is unimportant because the square of a negative number is a positive number. As an example, an air movement in a first direction of 2 ft/sec will result in a static pressure that is equal to the static pressure resulting from an air movement in the opposite second direction at −2 ft/sec. Since the relationship between static pressure and air velocity is instantaneous under the Bernoulli principle, AC movement of air in a first direction followed by movement in a second direction opposite to the first direction along the surface of a wing will generate lift, just as does DC air flow in only one direction.

Figure 3:
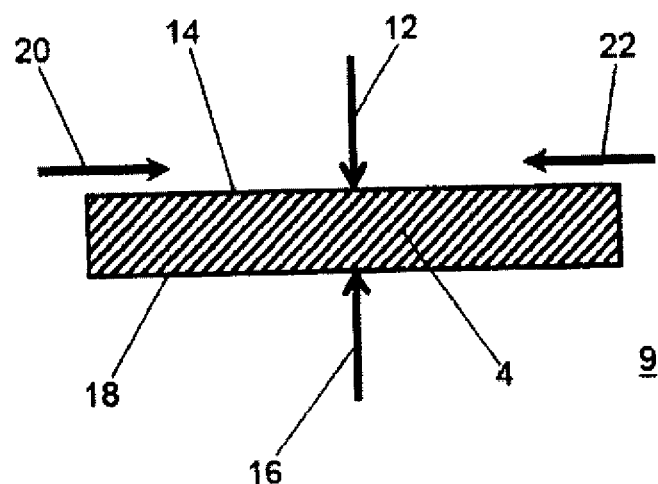
FIG. 3 is an illustration of the generation of lift by AC air movement.

FIG. 3 illustrates the principle of AC air 8 movement. A flat wing member 4 has a static air pressure 12 acting on a wing surface 14. The wing member 4 has an ambient air pressure 16 acting on the opposite side 18 of the wing member 4. In the absence of the movement of air 8, the pressures 12, 16 on the opposing sides 14, 18 of the wing member 4 are equal to each other and are the ambient air pressure 16, resulting in no net aerodynamic force acting on the wing member 4.

As shown by FIG. 3, if the air 8 adjacent to the wing surface 14 has a velocity in a first direction 20 parallel to the wing surface 14 of the wing member 4 while the air 9 adjacent to the opposite side 18 is still, then the static pressure 12 acting on the wing surface 14 of the wing member 4 is reduced proportional to the square of the velocity from the Bernoulli principle, while the ambient air pressure 16 acts on the bottom side 18 of the wing member 4, resulting in a net force acting on the wing member 4. If the wing surface 14 is oriented to face generally in an upward direction, then the net force is lift.

If the direction of movement of the air 8 adjacent to the wing surface 14 is reversed so that the air 8 has a velocity in a second direction 22 opposite to the first direction 20, then the static pressure 12 is still reduced proportional to the square of the velocity, while the ambient air pressure 16 continues to act on the opposite side 18 of the wing member 4. The result is a net force on the wing member 4. Again, if the wing surface 14 is oriented to face generally in an upward direction, then the net force is lift.

In short, the oscillating movement of air 8 along a wing surface 14 generates orthosonic lift.

Figure 5:
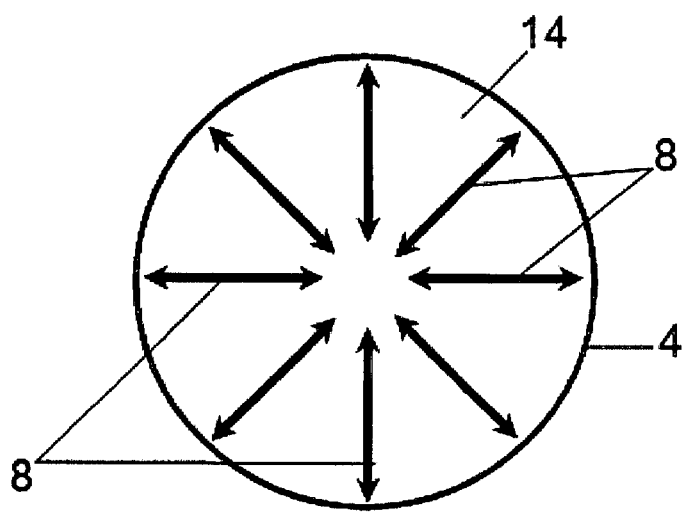
FIG. 5 is a top view of the wing of the example of FIG. 4
Figure 6:
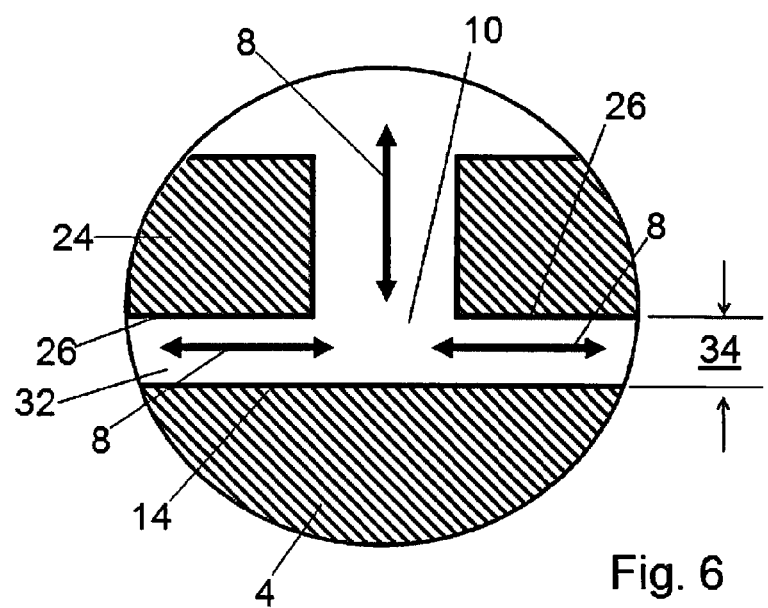
FIG. 6 is a detail sectional view of the port and volume of the example of FIG. 4.
Figure 4:
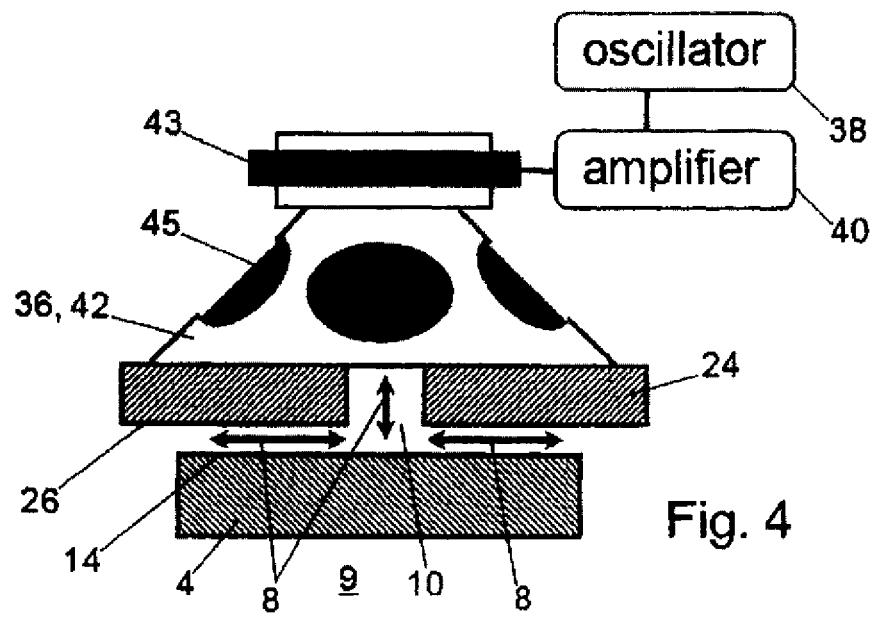
FIG. 4 is partial sectional view of a first example generating orthosonic lift.
Figure 5:
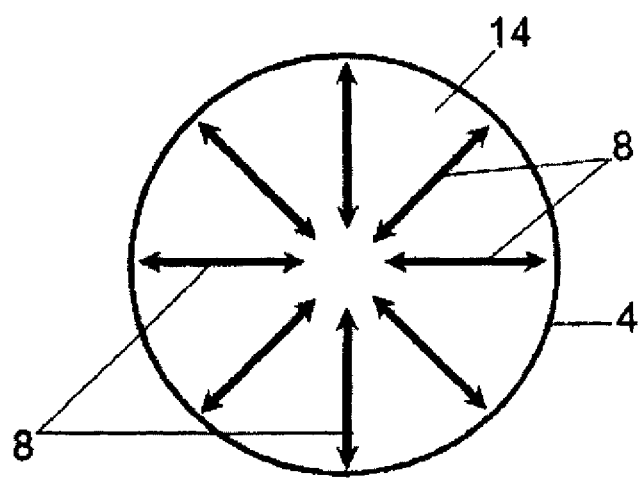
Figure 6:
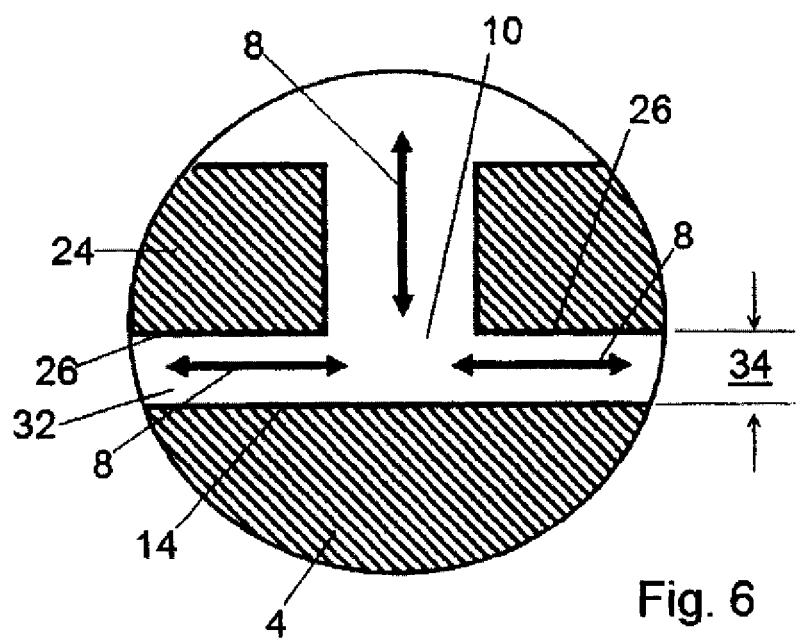
Figure 7:
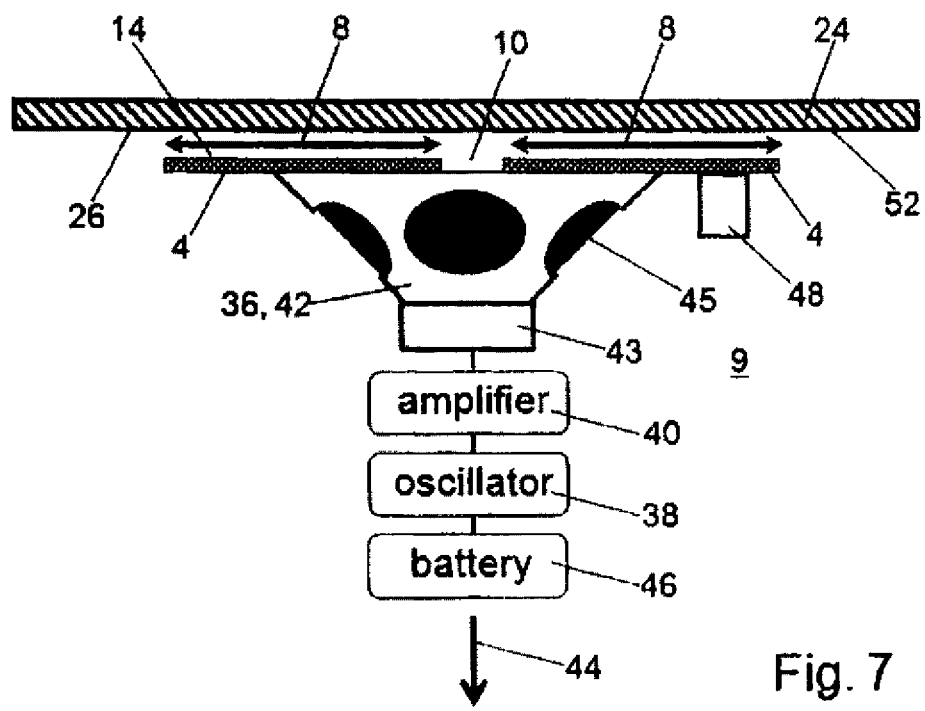
Figure 8:
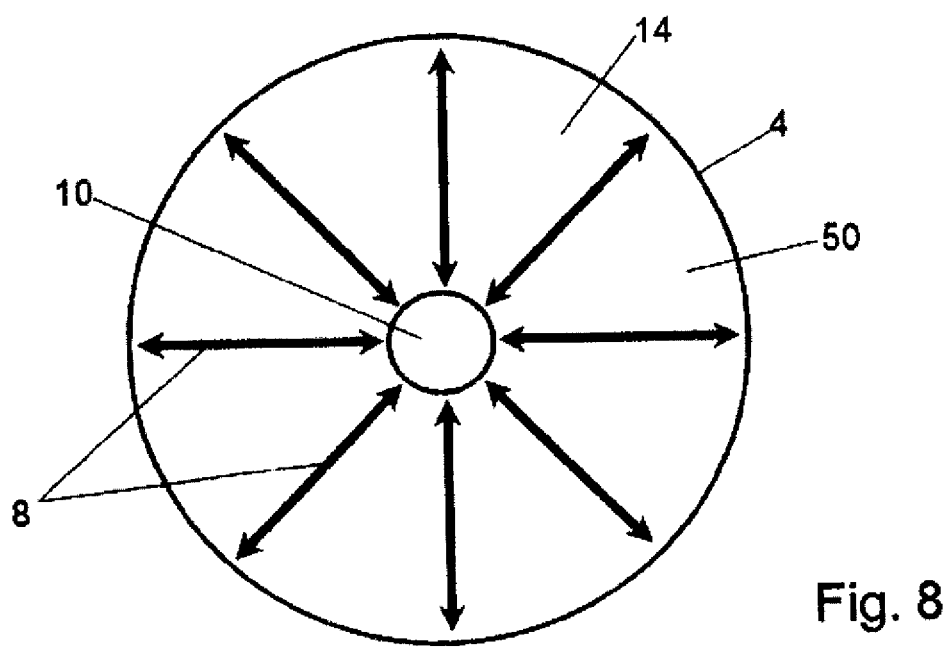
Figure 9:
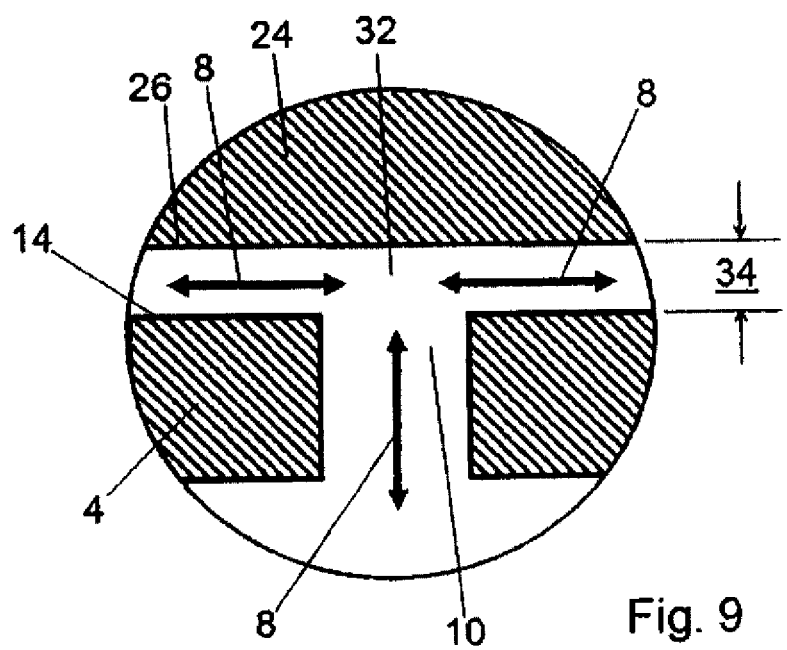
Figure 10:
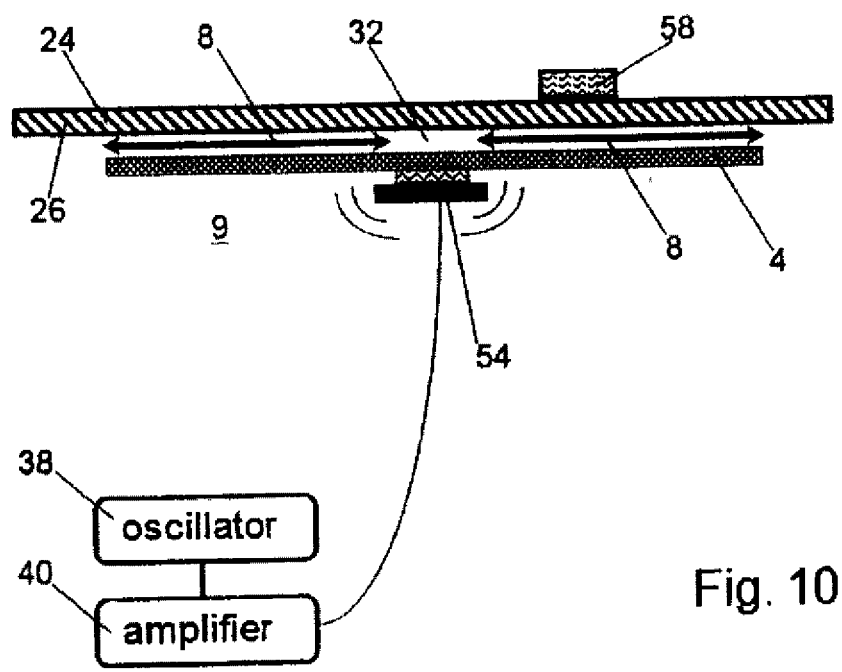
Figure 11:
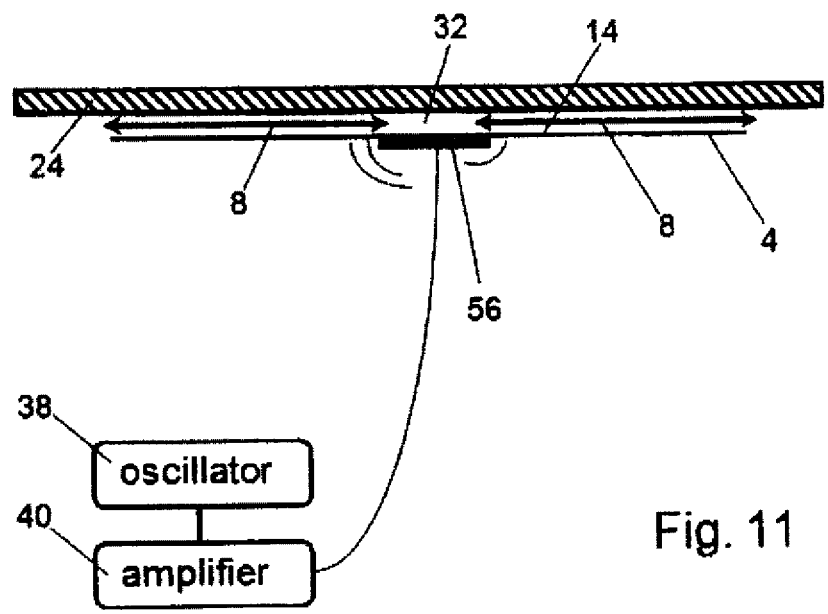
Figure 12:
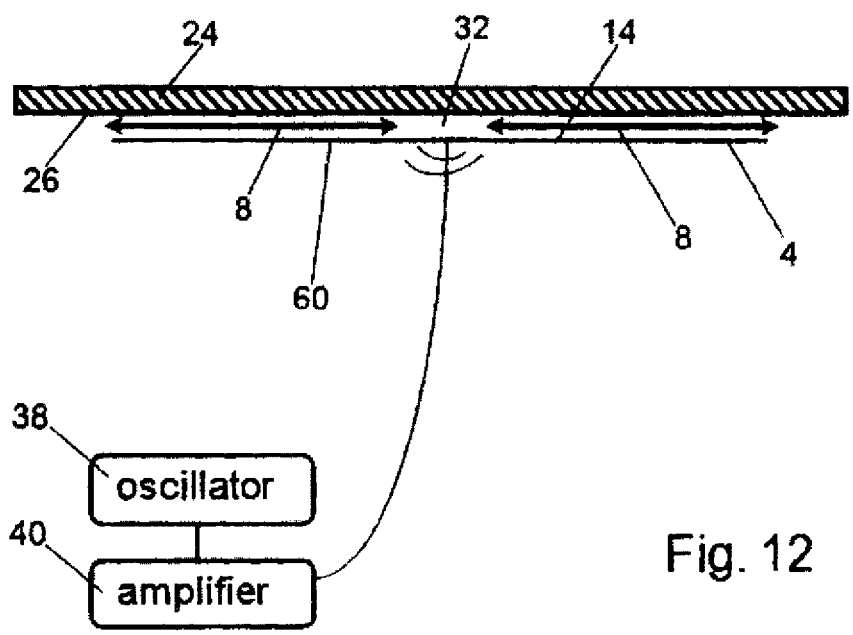
Figure 13:
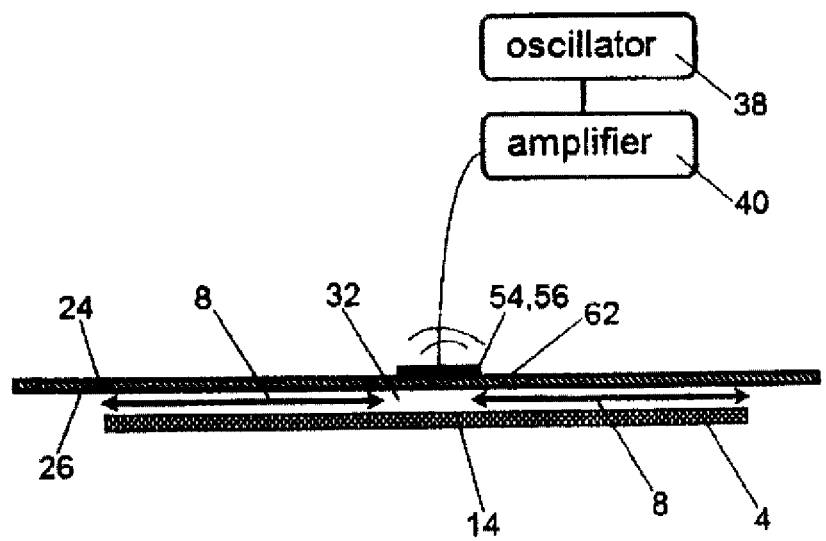
Figure 14:
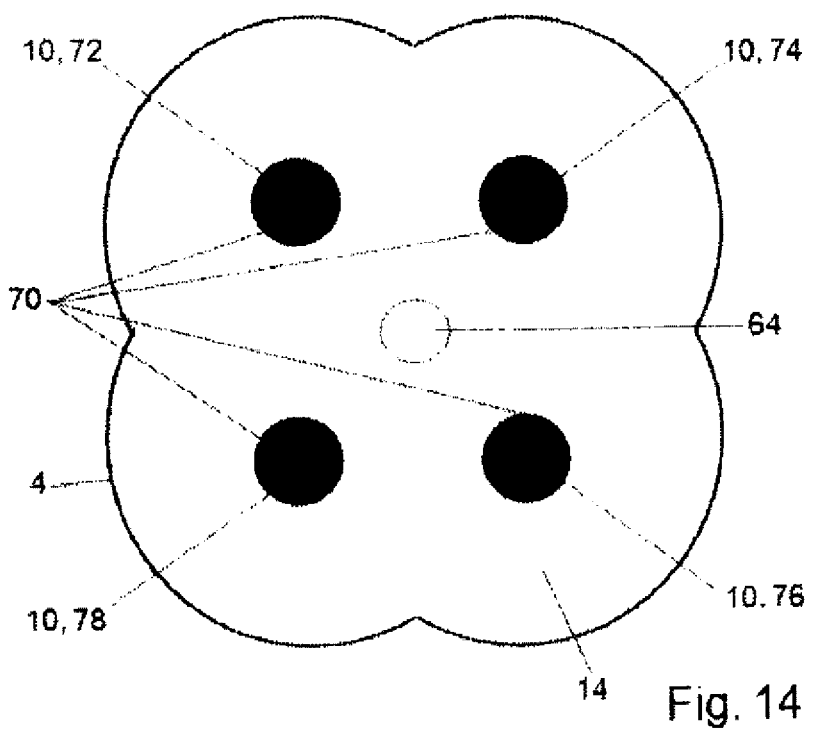
Figure 15:
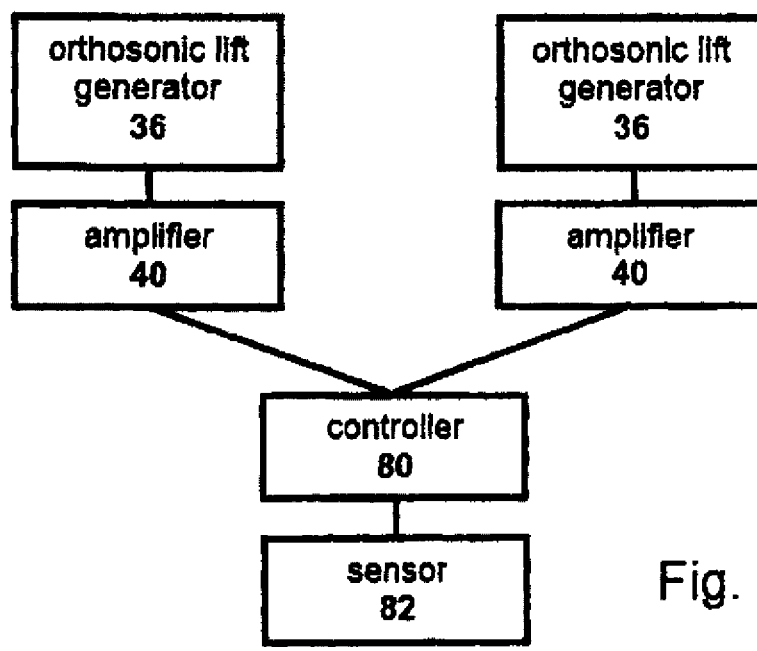
Figure 16:
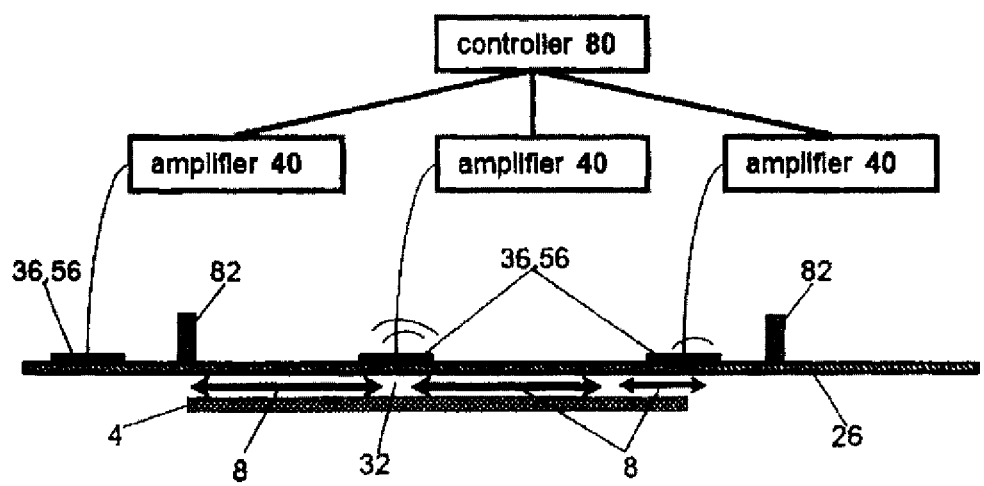
Figure 17:
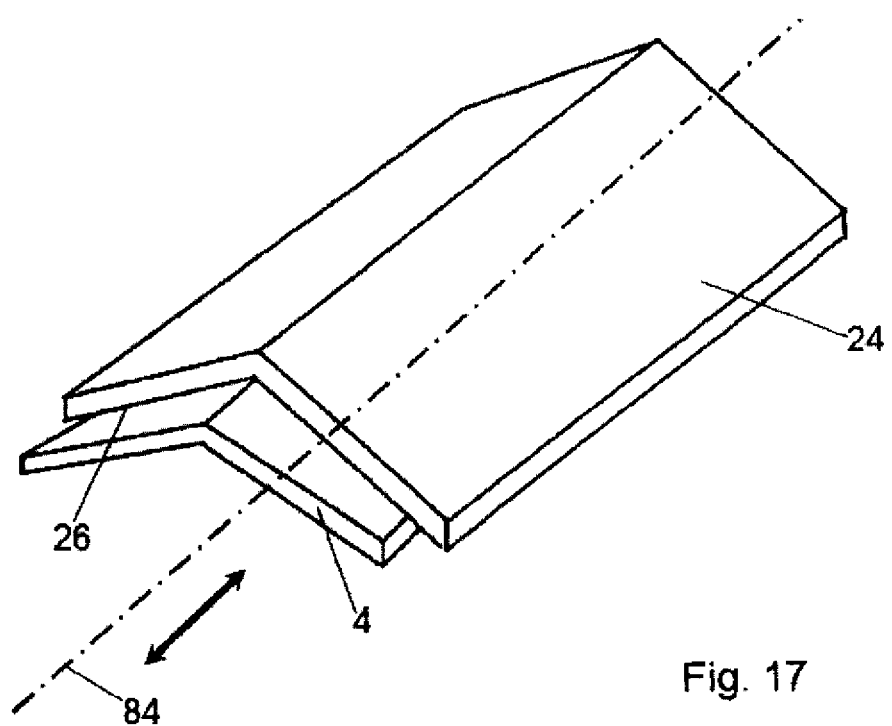
Figure 18:
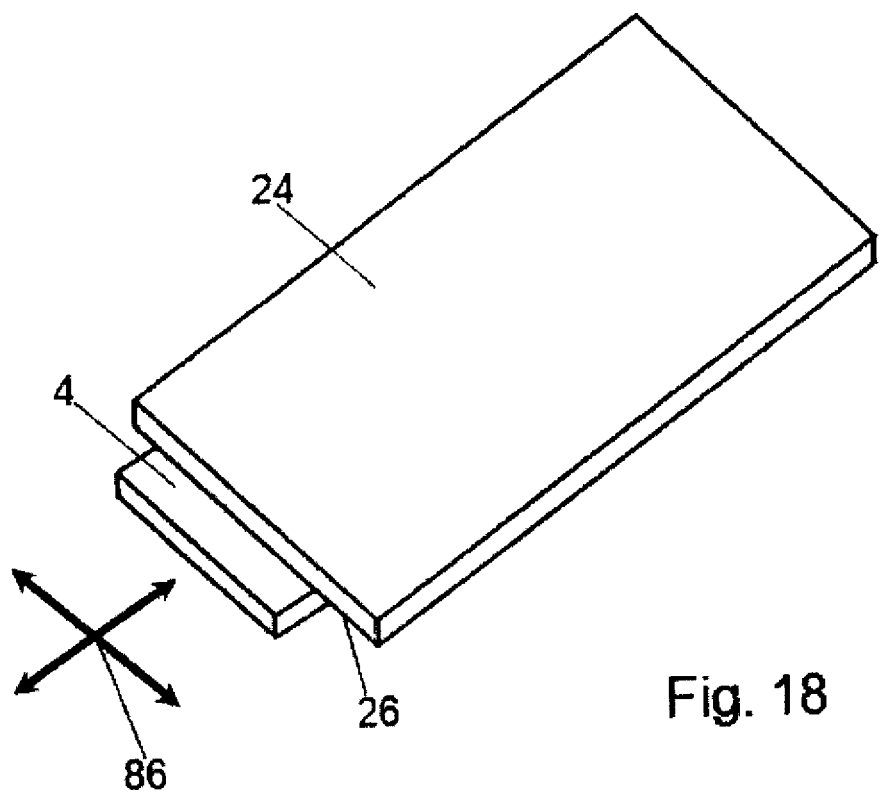
Figure 19:
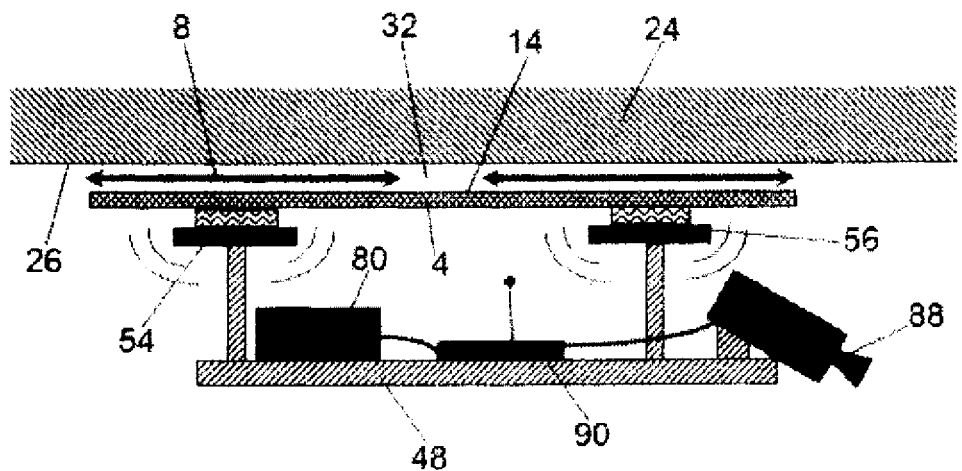
Figure 20:
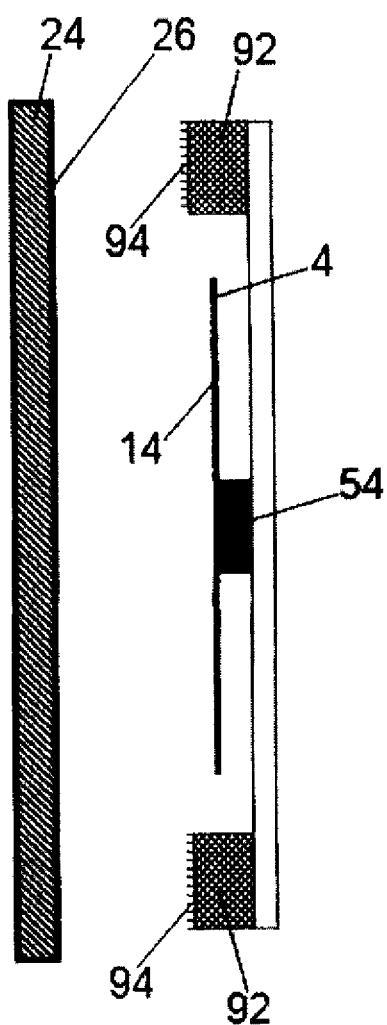
Figure 21:
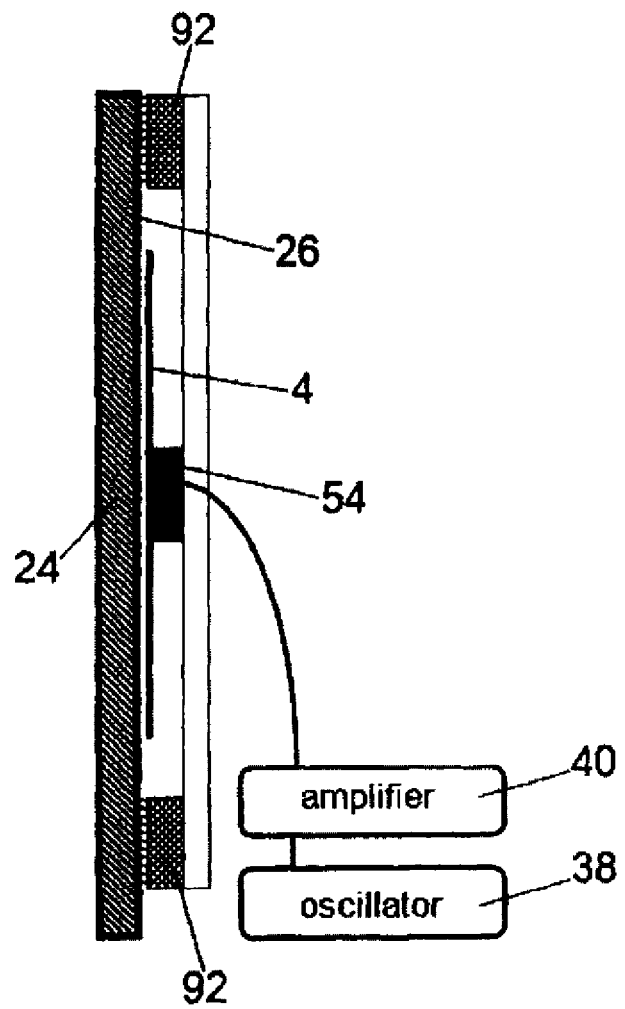
Figure 22:
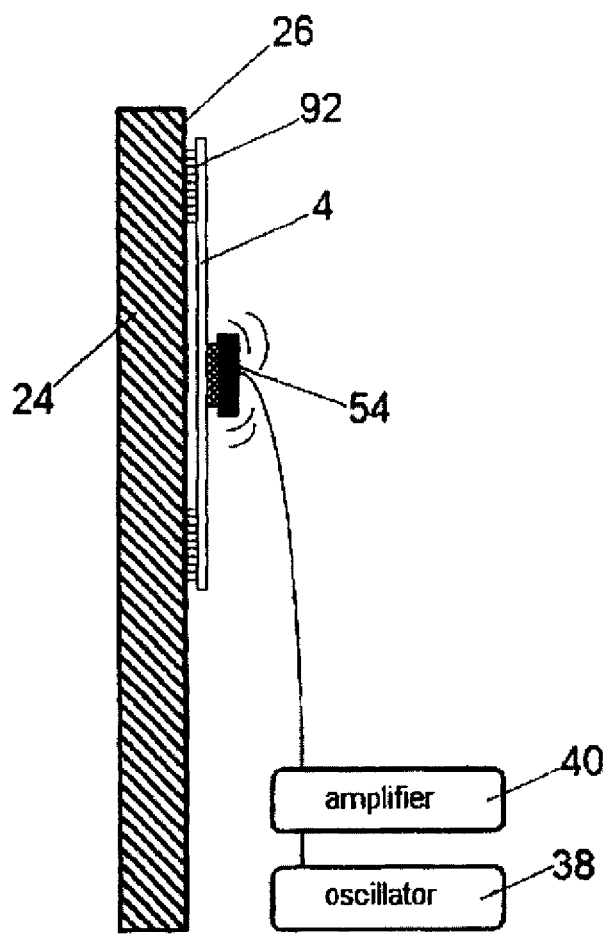

FIGS. 4 and 5 and 6 illustrate a first apparatus. FIG. 4 is a partial section of the apparatus in side view. FIG. 5 is a top view of the wing member 4 and FIG. 6 is a detail section view of the port 10 and volume 32. A support member 24 has a support surface 26. The support member 24 may be in a fixed location. A port 10 penetrates the support surface 26. The port 10 is a duct conveying the AC movement of air 8 from an orthosonic lift generator 36 through the support surface 26 and into the volume 32. The volume 32 is defined by the space 34 between the support surface 26 and the wing surface 14. The orthosonic lift generator 36 is in fluid communication with the volume 32 through the port 10. In this instance, the orthosonic lift generator 36 comprises a loudspeaker 42. The loudspeaker comprises a transducer 43 and a diaphragm 45. The oscillator 38 generates an electrical signal of a selected frequency. The amplifier 40 increases the amplitude of the signal. The loudspeaker 42 converts the electrical energy of the amplified signal into mechanical energy; that is, into sound energy of the oscillating air 8. The air 8 oscillates at the selected frequency as illustrated by FIG. 5 radially about the port 10 and in the volume 32 between the support surface 26 and wing surface 14. The oscillating air 8 acts as described above for FIG. 3, resulting in a net orthosonic lift applied to the wing member 4.

Figure 7:
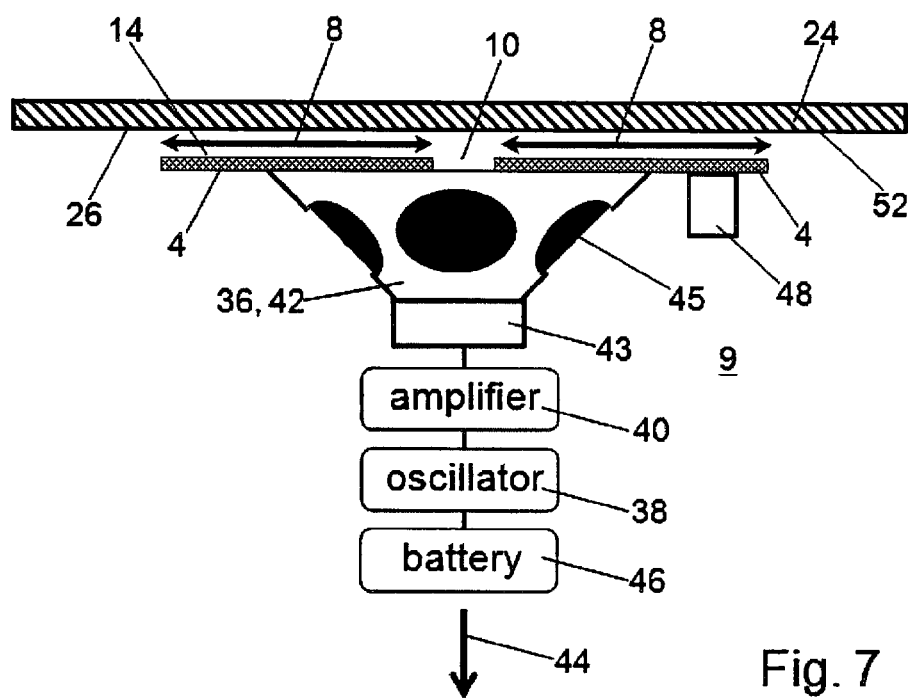
FIG. 7 is a schematic partial sectional view of an embodiment having a port penetrating a wing surface.
Figure 8:
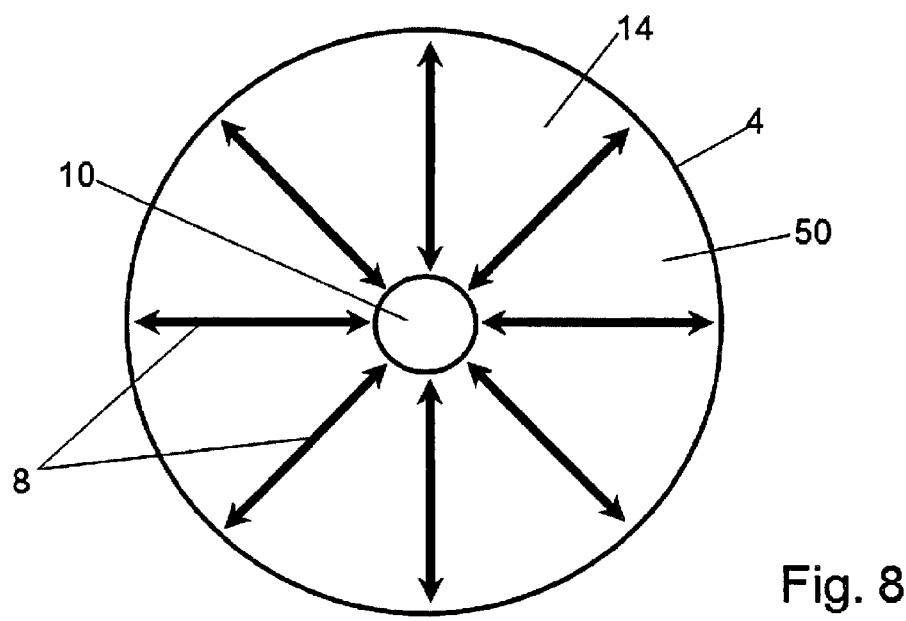
FIG. 8 is a top view of the wing of FIG. 7.
Figure 9:
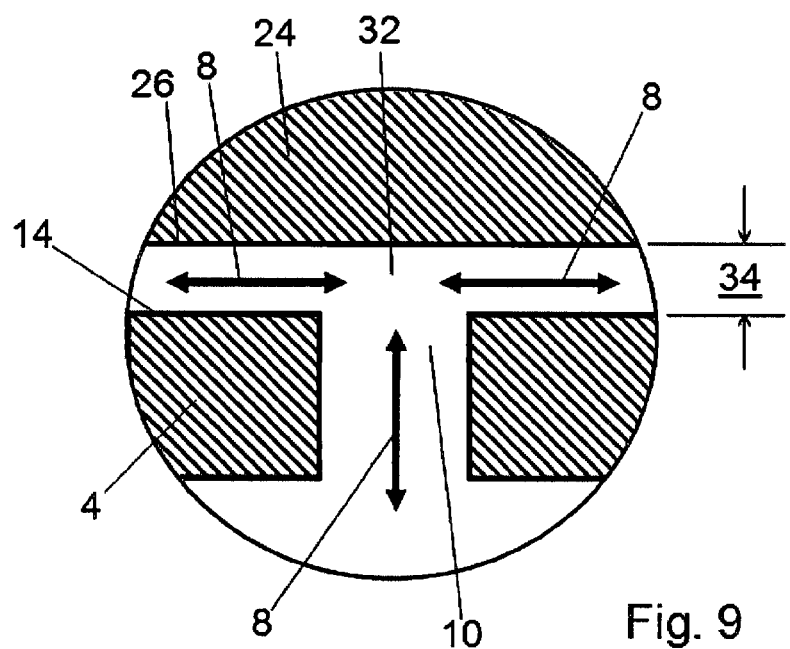
FIG. 9 is a detail cutaway view of the port of FIG. 7.

FIGS. 7, 8 and 9 illustrate a second apparatus. FIG. 7 is a partial sectional side view of the apparatus. FIG. 8 is a top view of the wing surface 14 of the wing member 4. FIG. 9 is a detail section view of the wing member 4, port 10 and support member 24. For the second apparatus of FIGS. 7, 8 and 9, the orthosonic lift generator 36 is attached to the wing member 4 and the port 10 communicates through the wing surface 14. The orthosonic lift generator 36 is in fluid communication with the volume 32 through the port 10. The support member 24 has a support surface 26 that is oriented in a generally downward direction 44; that is, the support surface is generally normal to the direction of the pull of gravity with the support surface 26 appearing on the underside of the support member 24. The wing surface 14 is oriented in a generally upward direction opposite to the downward direction 44 of the support surface.

The orthosonic lift generator 36 is illustrated by FIG. 7 as a loudspeaker 42 that receives a signal from an oscillator 38 and through an amplifier 40. The loudspeaker 42 comprises a transducer 43 that is configured to vibrate a diaphragm 45. The orthosonic lift generator 36 operates in the manner described above relating to FIG. 4. A power supply 46 may be attached to the wing member 4 and power the oscillator 38 and amplifier 40, allowing the wing member 4 to move without constraint from cables connecting to an external power supply. Any suitable power supply may be used, such as a battery, fuel cell or capacitor. Alternatively the amplifier and oscillator may be powered from an external power supply by cable or by induction or by any other means known in the art to convey electrical power from one apparatus to another.

For orthosonic lift generators 36 that rely upon conveying oscillating air 8 to the volume 32, such as the loudspeaker 42 illustrated by FIGS. 4 and 7, a duct 10 transmits the energy of the oscillating air 8 from the orthosonic lift generator 36 to the volume 32. Orthosonic lift generators 36 comprising mechanical pumps such as a piston and cylinder also require use of a duct 10 to transmit the energy of the oscillating air to the volume 32. For orthosonic lift generators 36 that rely upon vibration of the wing surface 14 or the support surface 26 such as exciters 54 and piezoelectric materials 56, no duct 10 is required and the orthosonic lift generator 36 is mechanically attached to the wing member 4 or the support member 24, which conducts the vibration of the exciter 54 or piezoelectric material 56 to the wing surface 14 or the support surface 26.

When the apparatus of FIGS. 7, 8 and 9 is in operation, the orthosonic lift generator 36 generates an AC movement of air 8, which the port 10 communicates to the volume 32 defined by the space 34 between the wing surface 14 and the support surface 26. The AC movement of air 8 is deflected by the support surface 26, resulting in the air 8 oscillating parallel to the support surface 26 and the wing surface 14, as indicated by the double-ended arrows on FIGS. 7 and 9. The AC movement of the oscillating air 8 results in a reduced static air pressure 12 acting on the wing surface 14 compared to the ambient pressure 16 acting on the wing opposite side 18, resulting in a net orthosonic lift acting on the wing member 4. If the AC movement of the air 8 is of a correct frequency and an adequate amplitude, and if the wing surface area 50 and the corresponding support surface area 52 of the support surface 26 are adequately large, then the net orthosonic lift will be adequate to support the combined mass of the wing member 4, the orthosonic lift generator 36 and a payload 48 against the pull of gravity and to maintain the wing surface 14 in close proximity to the support surface 26.

Figure 10:
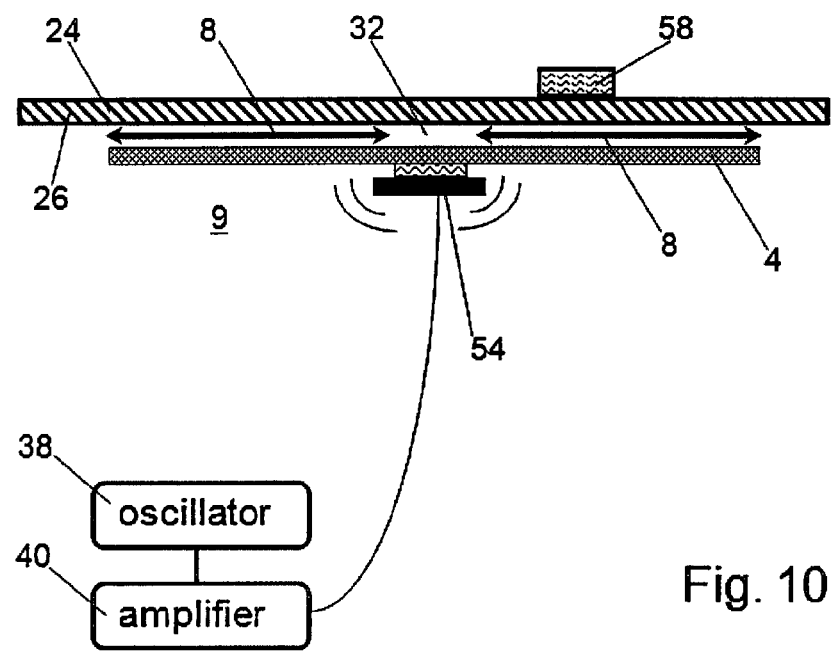
FIG. 10 is a side view of an embodiment using an exciter attached to the wing member.
Figure 11:
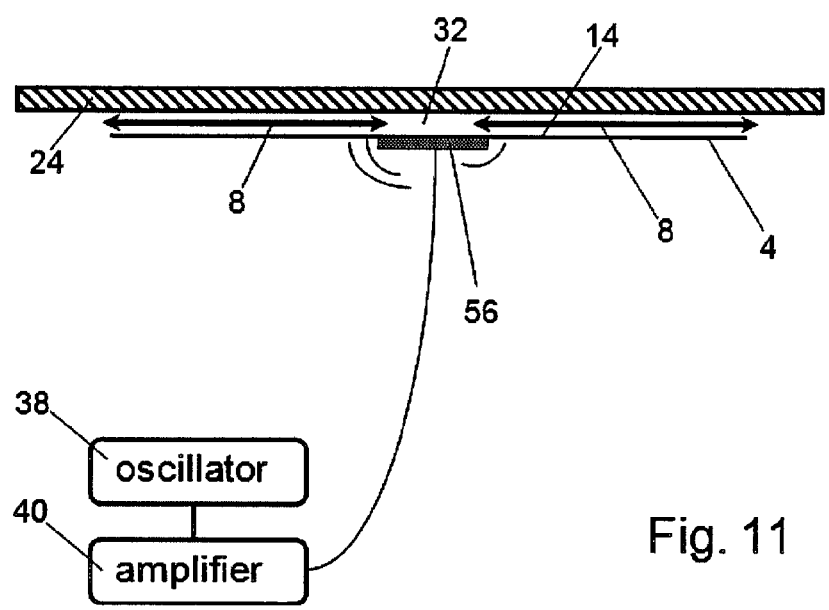
FIG. 11 is a side view of an embodiment using a piezoelectric material attached to the wing member.
Figure 12:
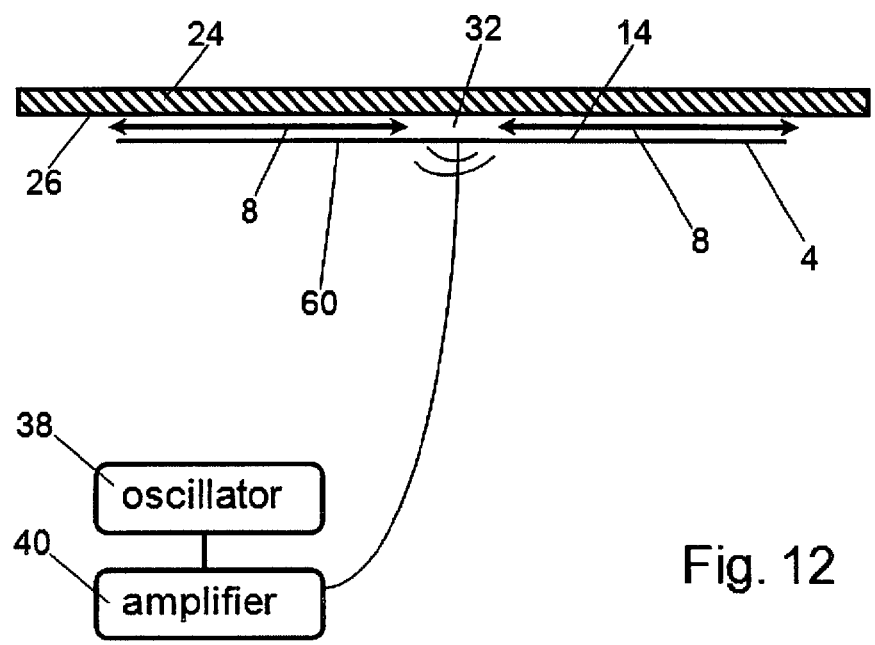
FIG. 12 is a side view of an embodiment in which a piezoelectric material defines an integrated wing member and orthosonic lift generator.

Any suitable apparatus to generate an oscillating movement of air 8 in the volume 32 may serve as the orthosonic lift generator 36. Other orthosonic lift generators 36 are illustrated by FIGS. 10 through 12. FIG. 10 illustrates use of an exciter 54. The exciter 54 includes a transducer, as does a loudspeaker 42. Unlike a loudspeaker 42, the exciter 54 lacks a basket and diaphragm 45. When activated, the exciter 54 causes the object to which it is attached to vibrate. The exciter 54 can be attached directly to the wing member 4 and causes the wing member 4 to vibrate. The exciter 54 does not require use of a port 10. The vibration of the wing member 4 causes the air 8 within the volume 32 to oscillate parallel to the wing surface 14, reducing the static pressure 12 on the wing surface 14 and resulting in a net orthosonic lift acting on the wing member 4. The exciter 54 vibrates when supplied with an electrical signal from an oscillator 38 that is amplified by an amplifier 40, as for the loudspeaker 42 embodiments of FIGS. 4 through 6 and 7 through 9.

FIG. 11 illustrates an orthosonic lift generator 36 comprising piezoelectric material 56 attached to a wing member 4. An oscillating electrical signal is generated by an oscillator 38 and amplified by an amplifier 40. A piezoelectric material 56 vibrates in response to the amplified, oscillating current. The vibration of the piezoelectric material 56 causes the wing member 26 to vibrate, which causes the oscillating movement of air 8 within the volume 32 in a direction parallel to the wing surface 14, with the result as described above relating to FIG. 3.

FIG. 12 also illustrates the use of piezoelectric material 56 as the orthosonic lift generator 36, but in the instance of FIG. 12, the piezoelectric material 56 defines the wing member 4 and wing surface 14 to define an integrated orthosonic lift generator and wing member 60. In the embodiment of FIG. 12, the piezoelectric material 56 is a film such as polyvinylidine fluoride (PVDF) with a conductive coating (such as PZ-04 by Images SI Inc., 109 Woods of Arden Road, Staten Island, N.Y. 10312) and covering substantially the entire wing surface 14 to create an integrated orthosonic lift generator and wing 60. The entire integrated orthosonic lift generator and wing 60 vibrates when energized by the amplified oscillating electrical current, causing the air 8 within the volume 32 to oscillate parallel to the wing surface 14, resulting in net lift on the integrated orthosonic lift generator and wing 60, as described above relating to FIG. 3.

The orthosonic lift generators 36 discussed relating to FIGS. 10 through 12 have the advantage over the loudspeaker 42 alternatives of FIGS. 4-9 in that they lack a port 10. The area of the wing member 4 available to generate orthosonic lift therefore is larger than an otherwise identical wing member 4 with a port 10. In addition, the port 10 of the embodiments of FIGS. 4-9 is located at the region where the energy of the oscillating air 8 is greatest, so that there is no wing surface 14 at the location that provides maximum static pressure 12 reduction for the orthosonic lift generators of FIGS. 10 through 12.

Figure 13:
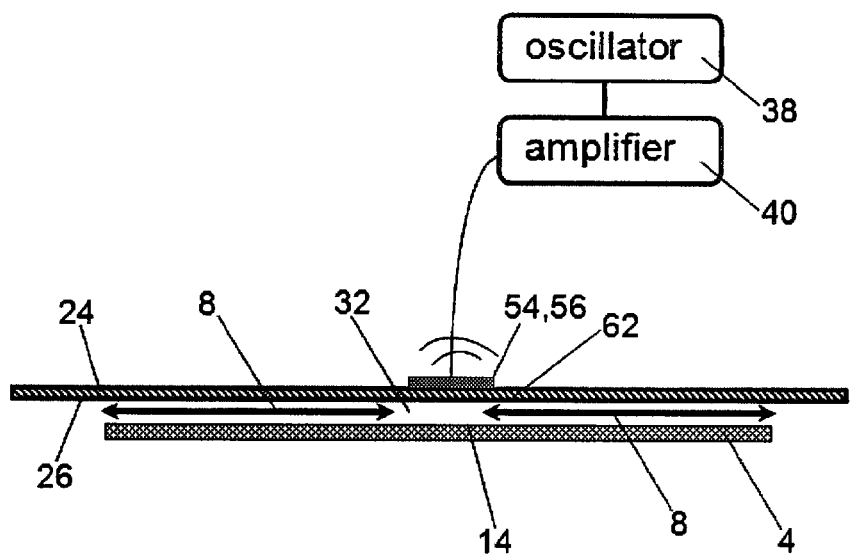
FIG. 13 is a side view of an embodiment in which a piezoelectric material defines an integrated orthosonic lift generator and support surface.

FIG. 13 illustrates that a piezoelectric material 56 or an exciter 54 may be configured to vibrate the support surface 26. Alternatively, the piezoelectric material 56 may define an integrated orthosonic lift generator and support surface 62, as by composing the support surface 26 of PVDF film. An oscillator 38 generates an alternating signal, which is amplified by an amplifier 40 and supplied to the exciter 54 or piezoelectric material 56, 62 so that a desired region of the support surface 26 vibrates. The vibrating support surface 26 generates the oscillating movement of air 8 parallel to the wing surface 14, resulting in lift of the wing member 4.

Figure 14:
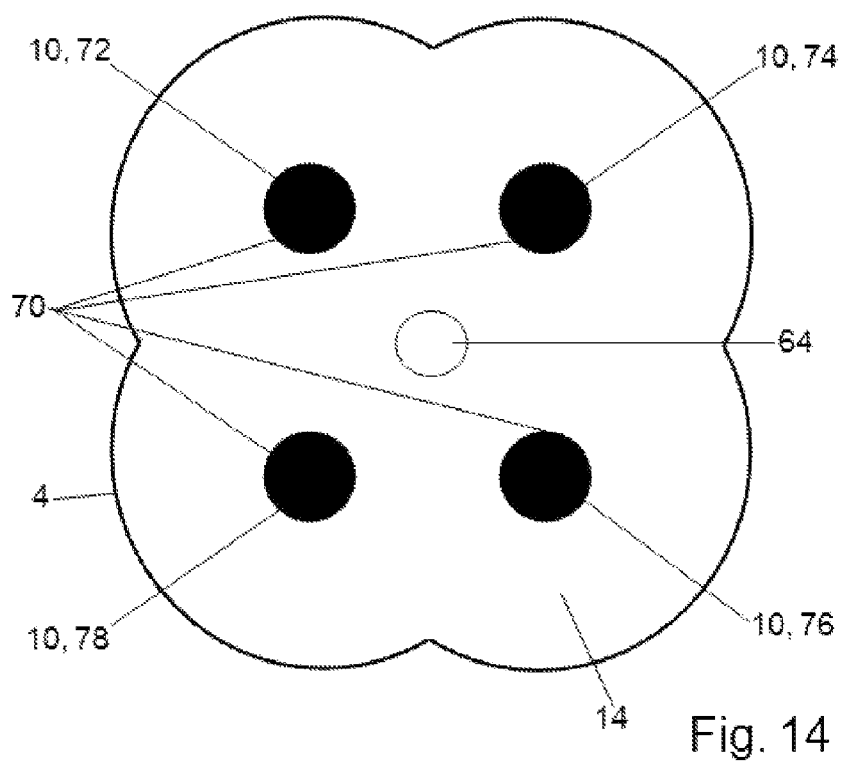
FIG. 14 is a top view of a wing surface featuring an array of orthosonic lift generators.

FIGS. 14 though 16 illustrate an array 70 of orthosonic lift generators 36. In the embodiment of FIG. 14, four orthosonic lift generators 72, 74, 76, 78 are mounted to a wing member 4. Four ports 10 communicate through the wing surface 14. Each of the ports 10 communicates the oscillating movement of air 8 generated by one of the orthosonic lift generators 72, 74, 76, 78. The use of orthosonic lift generator arrays 70 as in FIG. 14 can provide distributed orthosonic lift with higher total power than is available from a single orthosonic lift generator 36. While FIG. 14 illustrates four ports 10 serving four orthosonic lift generators 72, 74, 76, 78, any desired number of orthosonic lift generators 36 and any desired number of ports 10 may be used. Although FIG. 14 illustrates use of orthosonic lift generators 72, 74, 76, 78 requiring ports 10, any of the orthosonic lift generators 36 described above may be used, including exciters 54 and piezoelectric material 56, that do not require ports 10.

For a wing member 4 having an orthosonic lift generator array 70 such as shown by FIG. 14, the speaker 42, exciter 54 and piezoelectric embodiments 56, 60 allow control of the amplitude, frequency, phase relations and complexity (wave shape) of the oscillating air movement from each orthosonic lift generator 36. If the four orthosonic lift generators 72, 74, 76, 78 are located equidistant from a central location and the orthosonic lift generators 72, 74, 76, 78 are configured to generate oscillating air movement of the same amplitude, frequency and phase, then a pressure node will occur at the location within the volume 32 central to the orthosonic lift generators 36. The pressure node is a location of oscillating air 8 pressure but with no or very little movement of the air 8. Because there is no movement of air parallel to the wing surface 14 at the pressure node, the location of the pressure node does not contribute desirably to the net lift on the wing member 4. A vent 64 may be provided at the location of the pressure node to relieve the oscillating high air 8 pressure and to reduce the mass of the wing member 30. Depending on the frequency and phase relationships, pressure nodes may occur at other locations on the wing surface 14. Vents 64 may be disposed at the location of the other pressure nodes to release air 8 pressure that does not contribute desirably to lift and to reduce wing member 4 mass.

Figure 15:
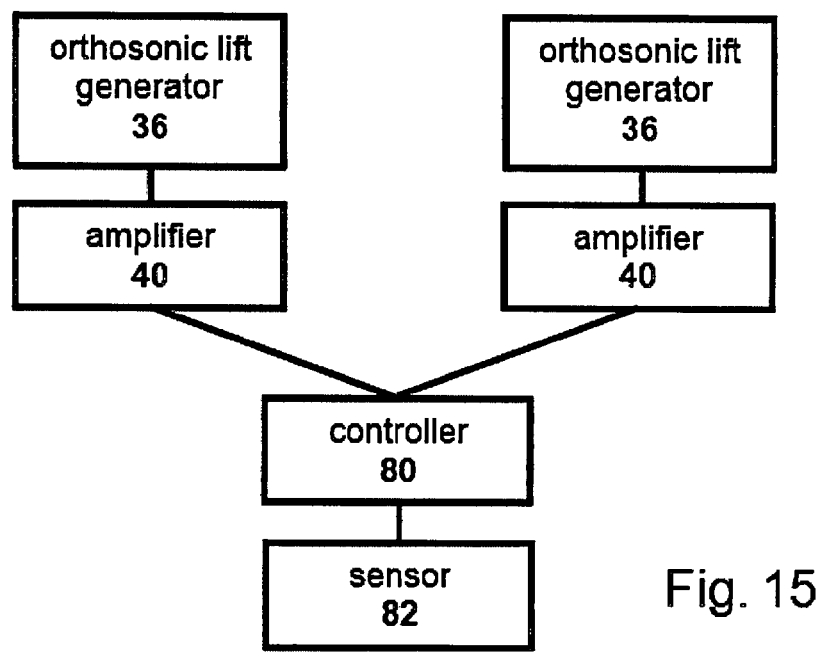
FIG. 15 is a schematic diagram of a control system.

FIG. 15 is a schematic diagram of a control system for an array 70 of two or more orthosonic lift generator 36. Although FIG. 15 illustrates two orthosonic lift generators, the control system may operate any number of amplifiers 40 and orthosonic lift generators 36. A controller 80 receives information from a sensor 82. The sensor 82 may be one of a plurality of sensors 82 that may detect any desired parameter. Those parameters may include the location of the wing member 4 on the support member 24, the space 34 between the wing surface 14 and the support surface 26 at one or more locations on the wing surface 14, the static pressure 12 in the volume 32 between the wing surface 14 and the support surface 26 at one or more locations, environmental conditions such as wind, unbalanced load conditions, ambient temperature and pressure, and any other parameters that may be useful for the operation of the wing member 4. The controller selects the amplitude, frequency, phase and complexity of the signal to each orthosonic lift generator 36 to achieve a desired condition of the wing member 4.

Figure 16:
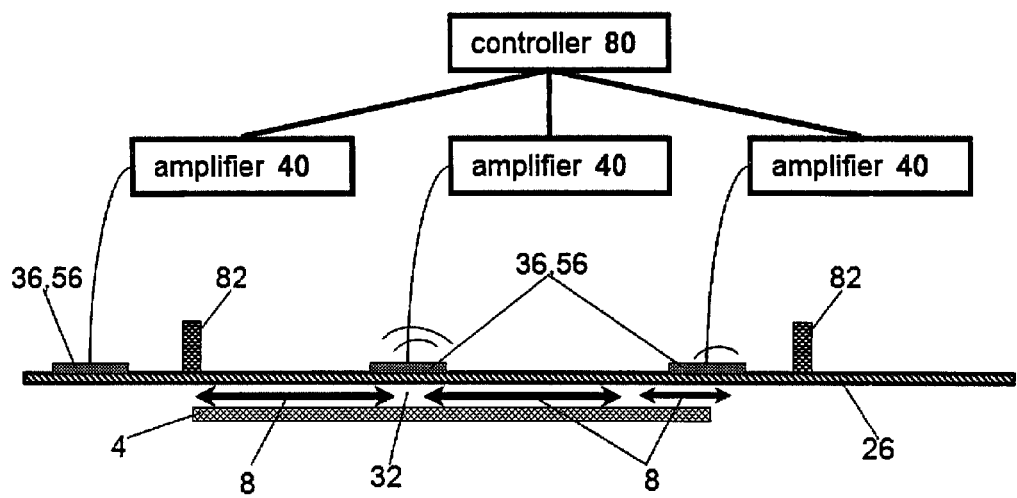
FIG. 16 is a side view of an array of piezoelectric orthosonic lift generators attached to the supporting surface.

The controller 80 of FIG. 16 may compensate for an imbalanced payload 48 by detecting the space 34, the static air pressure 12, or both in the volume 32 between the wing surface 14 and the support surface 26 one or more locations on the wing surface 14 and by increasing the amplitude of the oscillating electrical signal supplied to the orthosonic lift generator 36 providing lift to the portion of the wing surface 14 that is detected to be pulling away from the support surface 26. The controller 80 may compensate for wind or induce locomotion by allowing the wing surface 14 to tilt slightly in the desired direction of travel by reducing the amplitude of the signal to the orthosonic lift generator(s) 36 corresponding to that direction or by increasing the amplitude of the signal corresponding to the orthosonic lift generator(s) 36 in the opposite direction. The net orthosonic lift acting on the tilted wing member 4 will have a component of that lift in the direction of the tilt, resulting in the wing member 4 being urged in the direction of the tilt.

As illustrated by FIGS. 14 and 16, the controller 80 may control the yaw of the wing member 4 by controlling the complexity and phase relationships of the oscillating air 8 at the ports 10 of the wing member 4 having three or more orthosonic lift generators 36. For the wing member 4 of FIG. 14 with four orthosonic lift generators 72, 74, 76 and 78 producing oscillating air 8 at the ports 10 of the same frequency, complexity and phase, the oscillating movement of the air 8 will generate orthosonic lift but will not apply a net force on the wing member 4 in any other direction. Modifying the signal to the orthosonic lift generators 36 so that the second 74, third 76 and fourth 78 orthosonic lift generators generate oscillating air movement 8 at the ports 10 with the phase shifted by +90°, +180°, and +270° respectively from the phase of the first orthosonic lift generator 72 may cause air 8 within the volume 32 to circulate in the counterclockwise direction, applying a yawing moment to the wing member 4 in the clockwise direction and causing the wing member 4 to rotate in the clockwise direction.

The control of amplitude, frequency, phase and complexity relationships within an array 70 of orthosonic lift generators 36 allows other possible operating options. The first and third orthosonic lift generators 72, 76 may be in phase while the second and fourth orthosonic lift generators 74, 78 are in phase with each other but 180° out of phase with the first and third orthosonic lift generators 72, 76. This would be conducive to AC vortigenic flow, a rapidly reversing vortex which may increase orthosonic lift without inducing rotation of the wing member 4.

Any other suitable mechanism to move and orient the wing member 4 may be used, such as propellers mounted to the wing member and rotated by electric motors, or directional compressed air jets propelling and orienting the wing member 4 by reaction to release of the compressed air. Other alternatives are motors turning wheels or tractor treads that engage the support surface 26.

FIG. 16 illustrates that the location of an array 70 of orthosonic lift generators 36 is not restricted to the wing member 24. The array 70 of orthosonic lift generators 36 as illustrated by FIG. 16 is mounted to the support member 24. Each of the orthosonic lift generators 36 is powered by a signal from the controller 80 that is amplified by an amplifier 40. The controller 80 is informed by a sensor 82 that may detect the location of the wing member 4. The controller 80 may activate the orthosonic lift generators 36 corresponding to the location of the wing member 4 and deactivate orthosonic lift generators 36 that do not correspond to the location of the wing member 4. The controller 80 may select and adjust the amplitude, frequency, phase relationships and complexity of the signal sent to each of the activated orthosonic lift generators 36 to control the yaw moment and direction of movement of the wing member 4. The orthosonic lift generators 36 of FIG. 17 are illustrated as composed of piezoelectric material 56, but any of the orthosonic lift generators 36 discussed above may be used.

Figure 17:
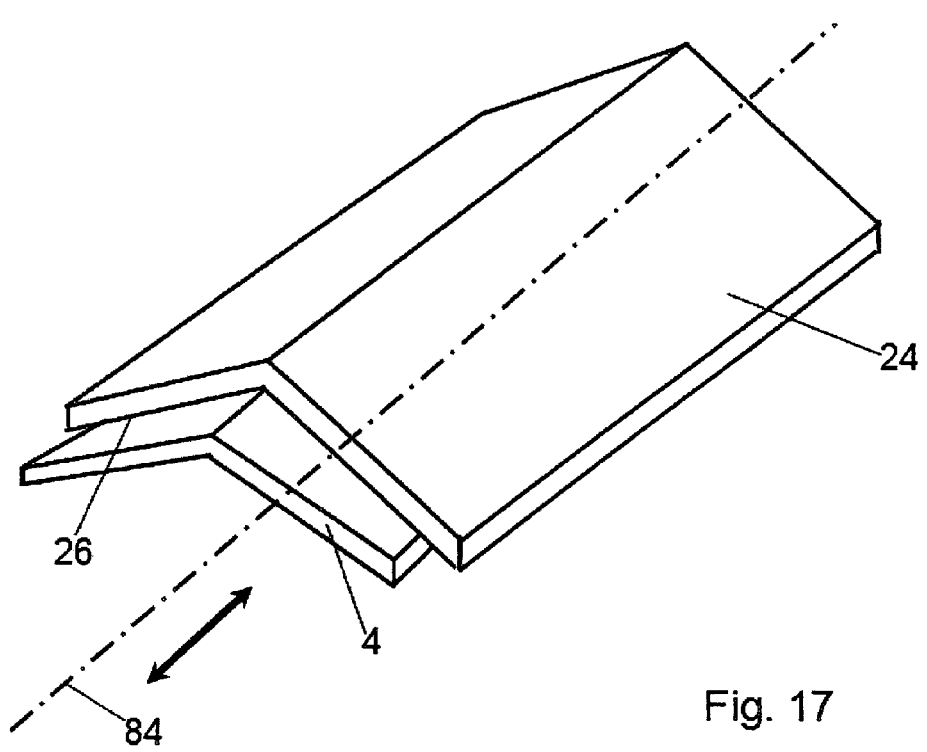
FIG. 17 is a perspective view of a support member defining an axis of travel.
Figure 18:
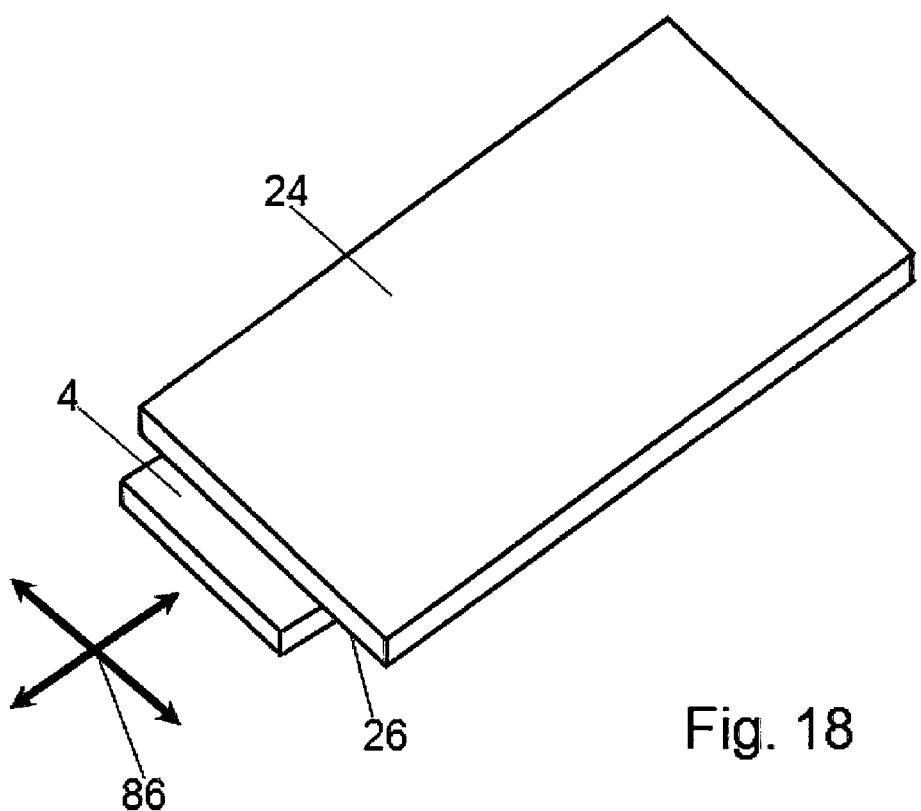
FIG. 18 is a perspective view of a support surface allowing travel by the wing member in two dimensions.

FIGS. 17 and 18 illustrate that the support member 24 may allow movement of the wing member 4 along a single axis of travel 84 or may allow movement in two dimensions 86. From FIG. 17 and for movement along a single axis of travel 84 in either of two directions, the support surface 26 and mating wing surface 14 are configured to be substantially flat in one dimension but to define a bend or curve in another dimension. The dimension that is substantially flat defines the axis of travel 84. From FIG. 18, mating support surface 26 and wing surface 14 that are substantially flat allow travel by the wing surface in two dimensions 86 on the support surface 26.

Figure 19:
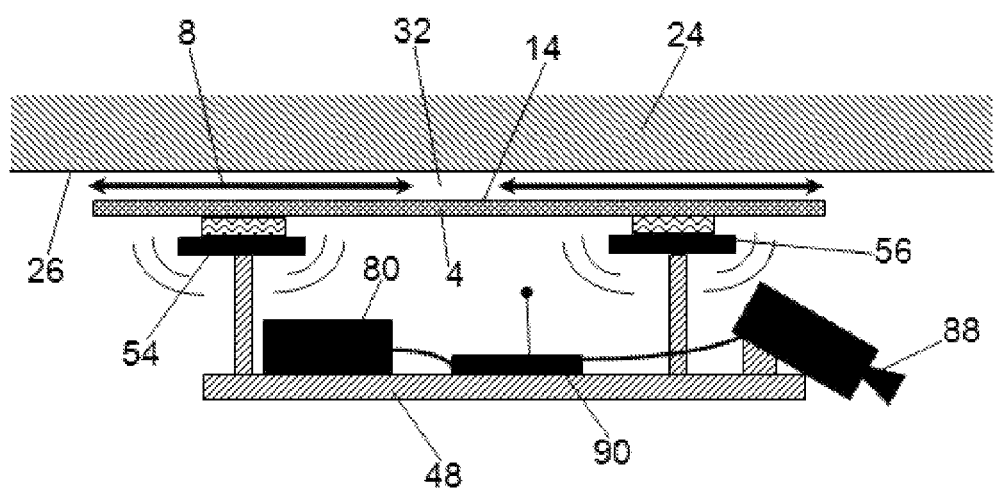
FIG. 19 is a side view of an example application.

FIG. 19 illustrates an application of the Invention. A wing surface 14 of a wing member 4 is attached to a plurality of exciters 54. A payload 48 supported by the wing member 4 includes a surveillance camera 88, a radio transceiver 90, controller 80 and sensors 82 (FIG. 16). The radio transceiver 90 receives commands from a remote operator. The commands are executed by the controller 80. The controller 80 detects the condition of the wing member 4 using the sensors 82 and adjusts the phase, amplitude and complexity of the electrical signals that are fed by the controller 80 to amplifiers 40 and then to the orthosonic lift generators 36 to control the orientation, location and direction of movement of the wing member 4, as described above, to achieve the command. The camera 88 collects surveillance images and the images are transmitted to a receiver by the radio transceiver 90.

In contrast to conventional airfoils, the flat wings surfaces illustrated by FIGS. 3-19 have no camber and zero angle of attack, resulting in minimal drag, turbulence or possibility of stall. In addition, there is no flow of air 9 beneath the wing member 4 when the wing member 4 is stationary to develop an undesirable downward lift component. Orthosonic lift is inherently efficient and the controller 80 can produce changes in amplitude, lift, phase and complexity much faster than systems relying on propellers, turbines, rockets or flaps. As orthosonic lift does not require forward motion, it is inherently well suited for hovering. Unlike helicopters, hovering with orthosonic lift does not require counter-rotational measures such as a tail rotor to compensate for torque reaction from a main rotor. Compared to aerodynamic lift from conventional engines, orthosonic lift is not noisy and when inaudible sound frequencies are employed, can be silent. Orthosonic lift generators 36 employed for orthosonic lift can be energy efficient, have very little heat signature and being electric, release no exhaust fumes. The orthosonic lift generators 36 are also relatively simple, reliable and low maintenance, often having only one moving part. This is particularly evident for example with a PVDF film, which may act at once as both wing surface 14 and orthosonic lift generator 36 in an integrated wing member and orthosonic lift generator 60 or an integrated support member and orthosonic lift generator 62.

Figure 20:
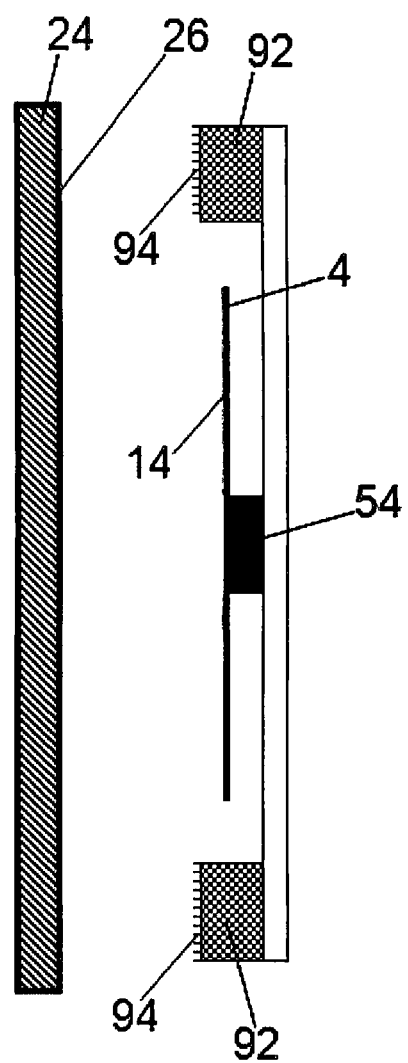
FIG. 20 is a side view of an apparatus and a brake.
Figure 21:
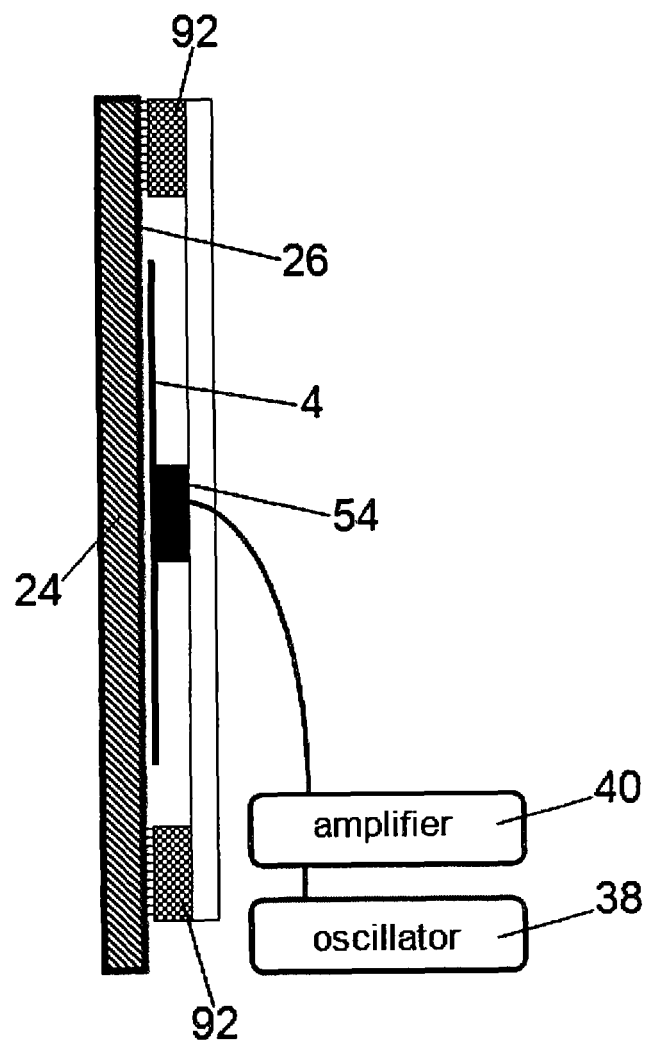
FIG. 21 is a side view of the brake in a deployed position.
Figure 22:
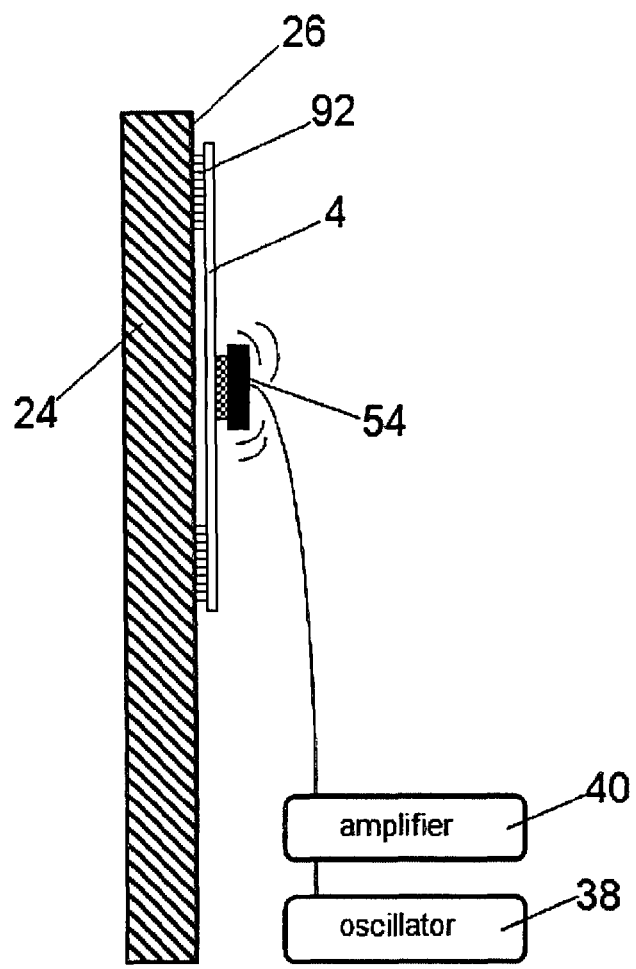
FIG. 22 is a side view of a brake integral to the wing member.

FIGS. 20, 21 and 22 illustrate operation of the wing member 4 on a support surface 26 where the axis of travel (FIG. 17) or the two dimensions of travel 86 (FIG. 18) are not horizontal. Because of the low friction between the wing surface 14 and the support surface 26, the force of gravity will urge the wing member 4 to the lowest location of the support surface 26. FIGS. 20 and 21 illustrate a vertically-oriented support surface 26 and a wing member 4 having a brake 92 and a friction surface 94. The friction surface 94 may be any suitable material that provides an adequate frictional engagement with the support surface, such as grit, bristles, ridges, or dimples. In the apparatus of FIG. 20, the wing member 14 is not in orthosonic engagement with theupport surface 26. The brake 92 and friction surface 94 are shown in a non-deployed position and do not engage the support surface 26.

FIG. 21 shows the wing member 14 of FIG. 20 in a deployed position on a vertically-oriented support surface 26. The exciter 54 is activated by oscillator 38 and amplifier 40. Vibrating wing surface 14 causes the air 8 between the wing surface 14 and the support surface 26 to oscillate and urges the wing surface 14 toward the support surface 26. Friction surface 94 of brake 92 engages the support surface 26, retaining wing member 4 in position on support member 24 and preventing wing member 4 from falling with respect to the support member 4. Brake 92 may be resilient, such as a resilient foam, polymer, spring or fabric. The brake 92 of FIGS. 20 and 21 is resilient and is compressed when the brake 92 engages the support surface 26. The brake may define an electrically-powered wheel or continuous track, both preventing sliding movement of the wing member 4 with respect to the support surface 26 and allowing an operator to move the wing member 4 with respect to the support surface 26. The gripping force of the friction surface 94 against the support surface 26 may be adjusted by selecting an appropriate frequency and amplitude of the signal to the exciter 54, determining the orthosonic force with which the wing member 4 presses the friction surface 94 against the support surface 26.

FIG. 22 illustrates a wing member 4 orthosonically engaging a vertical support surface 26. The friction surface 94 is incorporated into the wing surface 14. The operation of the embodiment of FIG. 22 is otherwise identical to that of FIGS. 20 and 21. The use of the brake 92 having a friction surface 94 allows the wing member 4 to be supported at any desired location on a support surface 26 defined by a vertical wall, by a sloping ceiling, or by any support surface 26 having any orientation.

Experimental Results

Several experiments were conducted to investigate orthosonic lift by deflection. The following is a brief summary of some of those experiments:

1. An audio speaker using a neodymium-iron-boron (NIB) magnet structure (Tang Band, W3-881 SI, 3 inch, 126 grams) acting as the orthosonic lift generator 36 was attached with silicone caulk to a six inch diameter wing member 4 cut from cardboard having a 2.5 inch central port 10 in an arrangement similar to FIG. 7. A flat, horizontal, 20×10×½ inch, plywood board mounted on two wood support panels acted as the support member 24. The speaker 42 and wing member 4 (total mass 138 grams) was driven by a 15 watt, 83 Hz sine wave from separate equipment. When held nearly touching the support member surface 26, the device readily suspended with orthosonic lift by radial deflection. It was movable about the entire support surface 26 with some friction relating to higher applied power. When power was cut, the device dropped from the support member 24.

2. In a similar experiment and also referring to FIG. 7, a smaller NIB speaker 42 (Vifa TC6FC00-04, 2 inch, 78 grams), acting as orthosonic lift generator 36, was affixed to a 4.5 inch diameter cardboard wing member 4 cut from a file folder. The wing member 4 was provided a central 1.5 inch port 10. In addition, a weight was affixed to the bottom of the speaker 42, representing a battery and circuitry (power supply 46, oscillator 38 and amplifier 40) to provide an amplified sine wave. The total mass of the speaker 42, wing member 4 and weight was 133 grams. At 130 Hz and 5 watts, the device suspended from the support member 24 when brought in close proximity to the support surface 26 and could be moved about it. At less than 5 watts, the device dropped.

3. Referring to FIG. 10, a light weight exciter 54 (HiWave HIAX19C01-8, 1.5 inch diameter, 10 grams) served as the orthosonic lift generator 36. The exciter 54 was mounted to a six inch diameter wing member 4 cut from a file folder. The wing member 4 had no port 10. The wing member 4 served the double role of diaphragm 45 and wing member 4. The wing member 4 and exciter 54 together had a mass of 34.3 grams. When a 240 Hz sine wave was supplied at 0.6 watts through 18 gauge wire, the wing member 4 and exciter 54 was found to easily suspend under a glass support member 24. The very thin layer of oscillating air on the smooth glass surface 26 allowed nearly frictionless lateral motion of the wing member 4 and exciter 54, much like a puck on an air hockey table. Upon trying to pull the active device away from the support member 24, considerable suction-like lifting capacity was felt. When the power was switched off, the device dropped off.

4. In a similar experiment and with reference to FIG. 10, a small exciter 54 (HiWave, HIAX11C005-32, 0.4 inch diameter, 5 grams) was coupled to a 3 inch wing member 4 of clear flexible plastic cut from a freezer bag. The total mass was 5.3 grams and when driven through light (22 gauge) transformer wire with a 700 Hz sine wave at ¼ watt, suspended below the glass support member 24. From above the glass, a small magnet 58, was used to repel the NIB magnet in the exciter 54 with very little effort.

5. With reference to FIG. 11, a thin piezoelectric material 56 (Murata, 20 mm diameter, 0.4 mm thick, 1600 nF, 2.2 grams), commonly used as a sound pickup for guitars, was used as the orthosonic lift generator 36. A 3-inch disk cut from a page of a magazine served as the wing member 4. The centers of the wing member 4 and piezoelectric material 56 were attached by a small drop of silicone caulk. When driven through light (22 gauge) wire with a 1,450 Hz sine wave at 12.5 volts (RMS), this device also suspended when placed up against the glass deflector.

LIST OF NUMBERED ELEMENTS

The following is a list of the numbered elements:
gripping member 2
wing member 4
blower 6
moving air 8
ambient air 9
port 10
static pressure 12
wing surface 14
ambient pressure 16
wing side 18 opposite to the wing surface
a first direction 20
a second direction 22
a support member 24
a support surface 26
a volume 32
a space 34
an orthosonic lift generator 36
oscillator 38
amplifier 40
loudspeaker 42
transducer 43
downward direction (direction of the pull of gravity) 44
diaphragm 45
power supply 46
payload 48
a wing surface area 50
a support surface area 52 an exciter 54
a piezoelectric material 56
magnet 58
an integrated wing member and orthosonic lift generator 60
an integrated support surface and orthosonic lift generator 62
a vent 64
an array of orthosonic lift generators 70
first orthosonic lift generator 72
second orthosonic lift generator 74
third orthosonic lift generator 76
fourth orthosonic lift generator 78
controller 80
sensor 82
an axis of travel 84
two dimensions 86
camera 88
radio transceiver 90
brake 92
friction surface 94

I claim:

1. A method of providing orthosonic lift, the method comprising;
   a. providing a support surface;
   b. providing a wing surface, said wing surface being attached to a wing member, said wing surface being movable with respect to said support surface, said wing surface generally corresponding to said support surface;
   c. placing said wing surface in a close proximity to said support surface with said support surface facing generally downward and said wing surface facing generally upward, said support surface and said wing surface defining a volume, said volume containing an air;
   d. actuating an orthosonic lift generator, said orthosonic lift generator being attached to said wing member, said orthosonic lift generator providing an oscillating movement of said air at a location within said volume, said oscillating movement of said air at said location alternating between said movement in a first direction and in a second direction, said second direction being opposite to said first direction, said first and said second directions being generally parallel to said wing surface and said support surface, whereby said oscillating movement of said air in said volume results in a static air pressure on said wing surface that is less than an ambient air pressure, said static air pressure and said ambient pressure defining a force acting on said wing, said force being sufficient to support said wing against a pull of gravity.

2. The method of claim 1 wherein said orthosonic lift generator is in fluid communication with said air within said volume through a port penetrating said wing surface.

3. The method of claim 1 wherein said orthosonic lift generator is not in fluid communication with said air within said volume through a port penetrating said wing surface.

4. The method of claim 1 wherein said orthosonic lift generator is selected from a list consisting of a transducer configured to vibrate a diaphragm, an exciter configured for vibration and a piezoelectric material configured to deform in response to an applied electrical voltage.

5. The method of claim 1 wherein said wing member is composed of a piezoelectric material that defines an integrated wing member and orthosonic lift generator.

6. The method of claim 1 wherein said support surface defines an axis of travel, said wing surface conforming generally to said support surface, whereby said wing member may move along said axis of travel.

7. The method of claim 1 wherein said support surface is substantially flat, said wing surface conforming generally to said support surface, whereby said wing member may move in two dimensions with respect to said support surface.

\* \* \* \* \*

UNITED STATES PATENT AND TRADEMARK OFFICE
CERTIFICATE OF CORRECTION

PATENT NO.      : 8,967,965 B1
APPLICATION NO. : 14/194761
DATED           : March 3, 2015
INVENTOR(S)     : Colasante It is certified that error appears in the above-identified patent and that said Letters Patent is hereby corrected as shown below:

Please delete Patent 8,967,965 in its entirety and insert Patent 8,967,965 in its entirety as shown on the attached pages Signed and Sealed this
Seventh Day of June, 2016

Michelle K. Lee
*Director of the United States Patent and Trademark Office*

CERTIFICATE OF CORRECTION (continued)

United States Patent
Colasante

(10) Patent No.: US 8,967,965 B1
(45) Date of Patent: Mar. 3, 2015

(54) APPARATUS AND METHOD FOR ORTHOSONIC LIFT BY DEFLECTION

(71) Applicant: David A Colasante, Newtown Square, PA (US)

(72) Inventor: David A Colasante, Newtown Square, PA (US)

(*) Notice: Subject to any disclaimer, the term of this patent is extended or adjusted under 35 U.S.C. 154(b) by 0 days.

(21) Appl. No.: 14/194,761

(22) Filed: Mar. 2, 2014

(51) Int. Cl.
  A47J 45/00 (2006.01)
  F01D 5/12 (2006.01)
  G10K 9/122 (2006.01)
  G10K 15/00 (2006.01)

(52) U.S. Cl.
  CPC ....... *F01D 5/12* (2013.01); *G10K 9/122* (2013.01); *G10K 15/00* (2013.01)
  USPC .............................. 416/1; 294/64.3; 294/185

(58) Field of Classification Search
  USPC ................................................. 294/64.3
  See application file for complete search history.

(56) References Cited

U.S. PATENT DOCUMENTS

| | | | |
|---|---|---|---|
| 5,006,749 A * | 4/1991 | White | 310/323.03 |
| 6,638,004 B2 * | 10/2003 | Berger et al. | 414/800 |
| 7,168,747 B2 * | 1/2007 | Hoehn et al. | 294/64.3 |
| 7,870,946 B2 * | 1/2011 | Zimmermann et al. | 198/630 |
| 8,225,924 B2 * | 7/2012 | Isobe | 198/752.1 |
| 2012/0110528 A1 * | 5/2012 | Herfert | 294/65 |

OTHER PUBLICATIONS

David Colasante, Youtube Video "AC & DC Lift of a Flat Wing" Published Oct. 24, 2012. Screenshots provided.*

* cited by examiner

*Primary Examiner* — Dwayne J White
*Assistant Examiner* — Justin Seabe
(74) *Attorney, Agent, or Firm* — Lipton, Weinberger & Husick; Robert J. Yarbrough

(57) ABSTRACT

An apparatus and method for providing orthosonic lift by deflection includes a support surface and a wing surface in close proximity to the support surface. The space between the support surface and the wing surface defines a volume of air. An orthosonic lift generator causes the oscillating movement of air in the volume parallel to the wing surface. The oscillating movement of air results in a static air pressure on the wing surface of less than the ambient air pressure, resulting in a net force acting on the wing member.

7 Claims, 20 Drawing Sheets

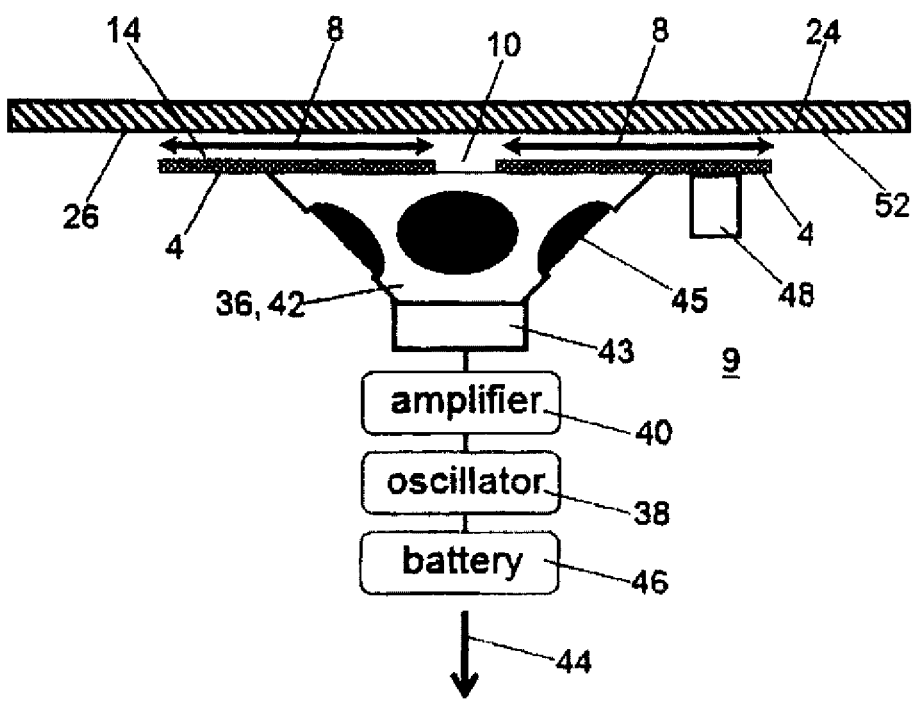

APPARATUS AND METHOD FOR ORTHOSONIC LIFT BY DEFLECTION

I. BACKGROUND OF THE INVENTION

A. Field of the Invention

The invention is an apparatus and method for applying force to an object orthogonal to the direction of an oscillating movement of air. As used in this document, the term 'oscillating' means that the air moves in a first direction followed by movement of the air in the opposite direction. A sound wave is an example of oscillating air. As used in this document, the term 'orthosonic' means perpendicular to the direction of the oscillating movement of air. For a propagating sound wave, the term 'orthosonic' means perpendicular to the direction of propagation of the sound wave. As used in this document, the term 'air' means atmospheric air and also means any gas or liquid.

B. Description of the Related Art

Aerodynamic lift is generated by movement of air with respect to a surface due to the well-known Bernoulli principle. According to the Bernoulli principle, the difference in static pressure, transverse to the direction of flow of air at two locations, is proportional to the difference in the squares of the velocity of the air at the two locations. A necessary corollary to the Bernoulli principle is that the air motion important to affect the static pressure at a surface is relative air motion between the surface and the air—either the air, the surface or both can be moving. Also, the location of the moving air that affects the static pressure at the surface is in the boundary layer immediately adjacent to the surface, since only air molecules that come in contact with the surface can apply pressure to the surface. Finally, the relation between velocity and static pressure is instantaneous. A change in velocity instantly causes a change in static pressure.

From the Bernoulli principle and all other things being equal, the faster the movement of air in the boundary layer parallel to the surface, the lower the static pressure exerted by the air against the surface.

In a prior art wing, air moves in only one direction, from the leading edge of the wing to the trailing edge. In the case of an aircraft wing, air is moving faster adjacent to the top surface of the wing than adjacent to the bottom surface of the wing. The air exerts a lower static pressure on the wing top surface than on the wing bottom surface. The difference in the static pressure on the wing top surface and the wing bottom surface results in lift.

The nature of fluid flow affects the operation of a conventional wing; namely, turbulence and drag. The flow of air beyond a critical distance or for longer than a critical time results in the flow becoming turbulent. Turbulent flow is chaotic and results in loss of lift and higher drag and subsequently increased power to maintain the velocity of the air with respect to the wing. In a conventional wing with air flow in only one direction, turbulence is unavoidable because the critical distance and time are exceeded by the one-way flow of air.

A 'Bernoulli grip' is a specialized case of a conventional wing. In a Bernoulli grip, air flows from an orifice on a gripping member. When the gripping member is moved into close proximity to the surface of an object, the air flowing from the gripping member moves radially away from the orifice between the surface of the object and a corresponding gripping member surface. The air is exhausted at the edges of the corresponding surfaces of the gripping member and object. From the Bernoulli principle, the velocity of the air as it moves across the gripping member causes the static pressure between the surfaces of the object and the gripping member to be reduced proportional to the square of the air velocity. The side of the object opposite to the gripping member experiences an air velocity of zero and the static pressure is the same as the ambient air pressure. The net force due to the differences in air pressure acting on the object urges the object toward the gripping member. The lifting power of the Bernoulli grip is reduced because the discharge of air from the orifice causes a local increase in air pressure in the vicinity of the nozzle due to the momentum of the moving air against the surface of the object, which reduces the net force urging the object toward the gripping member.

The prior art does not teach the apparatus or method of the invention.

II. SUMMARY OF THE INVENTION

The Invention is an apparatus and method for deriving orthosonic force from the oscillating movement of air. An oscillating movement of air, such as a sound wave, is also referred to in this document as alternating current or 'AC' air movement. A non-alternating flow of air in a single direction is referred to in this document as a direct current or 'DC' air flow. The Inventor recognized that a reduction in static pressure, consistent with the Bernoulli principle, is generated not only from the DC air flow in one direction along a surface, as in a conventional aircraft wing, but also from the movement of air in any direction, including AC movement of air along the surface. The Invention stems from that insight.

A. Orthosonic Lift

For the apparatus of the invention, a support member has a support surface and a wing member has a wing surface. The support and wing surfaces are in close proximity one to the other. An oscillating movement of air induced between the two members and parallel to the two surfaces causes the static pressure of the air acting on the two surfaces to be reduced compared to ambient air pressure. Ambient air pressure acts on the other side of both members. Since the static pressure between the two surfaces is less than the ambient pressure, the net air pressure acting on the two members urges the two members one toward the other.

In a first flying wing embodiment of the invention, the support member is in a fixed location. The support surface of the support member generally is flat and oriented orthogonal to the direction of the force of gravity, with the support surface facing down. The wing surface is generally flat and is facing up but is not in a fixed location with respect to the support surface. When the support and wing surfaces are placed in close proximity and oscillating air movement is induced between the two surfaces by an orthosonic lift generator, discussed below, the pressure differential across the wing member will urge the wing member vertically toward the support member. If the oscillating air movement is sufficiently energetic and if the corresponding areas of the support and wing surfaces are sufficiently large, the pressure differential across the wing member will generate sufficient orthosonic lift to support the mass of the wing member and a payload against the pull of gravity, maintaining the wing surface in close proximity to the support surface.

For the first flying wing embodiment, the wing member flies in the same manner that a conventional aircraft flies—the air pressure differential acting across the wing member lifts the wing member. The wing member differs from a conventional aircraft wing in that (a) the wing member is not required to move through the air to generate lift, (b) no net movement of air across the wing is required to generate lift, and (c) orthosonic lift derives from oscillating movement of air across the top surface of the wing combined with no air motion across the bottom surface of the wing.

For the flying wing application described above, the engagement of the support surface and wing surface is a very low-friction engagement. The support and wing surfaces are separated by a thin layer of oscillating air and may not physically touch. The air oscillates parallel to the support and wing surfaces and acts as an air bearing. Like a conventional air bearing, the flying wing application exhibits a very low friction. Unlike a conventional air bearing, there is little or no net movement of air between the bearing surfaces. The apparatus may experience little or no turbulence, and hence very little drag, because the movement of the air may occur for only a brief period of time and over a short distance—the time and distance of the air movement can be much less than the critical time and distance for turbulent flow. The low turbulence and hence low drag results in very low resistance to movement in the engagement between the support and wing members. Effectively, the only resistance to movement of the wing member is the air resistance presented by the ambient air as the moving wing member pushes the ambient air aside. As a result, the wing member may be moved with very little force.

The close proximity of the support and wing surfaces is maintained by a self-regulating feedback mechanism. If the wing surface approaches too closely to the support surface, the proximity of the support and wing surfaces physically constricts the oscillating air movement between those surfaces. Because of the constriction, the oscillating movement of air in the volume between the two surfaces drops. Because the oscillating air movement drops, the static pressure on the wing surface increases. As a result, the mass of the wing member overcomes the diminishing orthosonic lift and the wing member moves away from the support member by a small distance. As the support surface and wing surface separate, the physical constriction is removed, the oscillating movement of air is restored and the net lift on the wing member increases to the point where the net lift overcomes the mass of the wing member and again lifts the wing member. The support and wing surfaces thus will tend to maintain a small separation distance. If the wing member is perturbed from that small separation distance, it will tend to move back to the separation distance at which the orthosonic lift generated by the oscillating air balances the force of gravity acting on the mass of the wing member and payload.

The support and wing surfaces both may be generally flat. If the support and wing surfaces are generally flat, then the wing member may move in any direction in the two-dimensional plane defined by the support surface of the support member. Alternatively, the support surface may define a generally straight line in one direction but not in another. In this event, the generally straight line will define an axis of travel for the wing member and the wing member may move only along the single axis of travel defined by the support surface. The shapes of the support and wing surfaces must correspond to maintain the close proximity of the wing surface and support surface, but curved, corrugated, cylindrical, angled or other corresponding shapes may be used.

As a first example of the flying wing embodiment of the Invention, the support surface may be the ceiling of a casino or airport and the wing member may be a mobile surveillance system capable of moving to any unobstructed location on the ceiling. As a second example of the flying wing embodiment, the support member and support surface may define the route of a light mass transit line. The passenger car of the mass transit line incorporates the wing member and follows the route defined by the support member.

As noted above, the Invention avoids the issues of turbulence and resulting power loss that affect a conventional wing because, for the Invention, the flow of air in any direction can be selected not to exceed the critical time and the critical distance. As a result, the power required to maintain lift is less than that for a conventional wing.

B. Orthosonic Lift Generator

As used in this document, the term 'orthosonic lift generator' means any mechanism to generate an oscillating movement of air between the support and wing surfaces. As a first example, a conventional loudspeaker includes a diaphragm attached to a transducer. The loudspeaker generates an oscillating movement of air when an alternating electrical signal is applied to the transducer. When that oscillating movement of air is confined and directed between the two adjacent surfaces of the two members, the motion of the air first in one direction and then in a second direction opposite to the first direction defines an AC air movement between the two surfaces. The oscillating, AC air movement between the two surfaces causes a static pressure of less than the ambient air pressure between the two surfaces. Orthosonic lift derives from the difference between the reduced static pressure between the adjacent surfaces and the higher ambient air pressure acting on the other side of the wing member.

As an alternative, one or both of the wing surface and the support surface can be configured to vibrate, as by attaching an exciter or piezoelectric material to the wing member or to the support member. An exciter is an electromechanical device similar to a loudspeaker, but lacking the speaker basket and speaker cone. Upon excitation by an alternating current, the exciter or piezoelectric material vibrates, causing the support surface or wing surface to vibrate. Vibration of the support surface or the wing surface generates oscillating movement of air within the space between the support and wing surfaces. In another alternative, one or both of the support and wing surfaces may be composed of the piezoelectric material so that applying an alternating current to the piezoelectric material causes the entire surface to vibrate. Where the wing member is composed of a piezoelectric material, the piezoelectric material also may serve as the structure of the wing member in addition to serving as the orthosonic lift generator.

The orthosonic lift generator may be mechanical, such as a piston reciprocating in a cylinder or a vibrating diaphragm, such as a diaphragm pump. The oscillating movement of air generated by the piston or vibrating diaphragm is confined and directed to the volume between the two adjacent surfaces of the support and wing members.

A mechanical orthosonic lift generator may be a vibrating reed exciting a resonant chamber, such as a clarinet or saxophone reed, located in a duct communicating to the volume between the wing and support surfaces. A small air movement past the reed may cause resonant oscillating movement of air in the volume between the wing and support surfaces. A free reed, such as an accordion reed, may be mounted in communication with the volume between the support and wing surfaces and caused to vibrate by a small air movement or by a periodic application of a magnetic field, as from an electromagnet. The vibration of the reed induces oscillating motion of air within the volume between the support and wing surfaces.

The orthosonic lift generator may be mounted to the wing member and direct the oscillating air movement through the wing surface to the space between the support and wing surfaces. Alternatively, the mechanisms to generate the oscillating movement can be mounted to the support member and direct oscillating movement through the support surface to the space between the support and wing surfaces.

Where the wing member is mobile on the support surface and the orthosonic lift generator is mounted to the support member, the orthosonic lift generators in a particular location can be energized to generate oscillating movement upon the approach of the wing member and can be de-energized to stop the oscillating movement upon the departure of the wing member from that location.

C. Movement of the Wing Member

The very low friction provided by the engagement of the support and wing surfaces allows the wing member to be moved with little more than the force required to overcome aerodynamic drag of the wing member moving through the ambient air. Where the orthosonic lift generator utilizes a magnet or generates a magnetic field, such as the loudspeaker or exciter mounted to the wing member, locomotion magnetic fields may be used to repel or attract the magnetic field of the orthosonic lift generator and hence to move the wing member. Where the orthosonic lift generator does not utilize magnetic fields, such as a piezoelectric orthosonic lift generator, one or more permanent magnets or electromagnets may be attached to the wing member to provide a magnetic field against which a locomotion magnetic field may act. The locomotion magnetic fields may be generated by electromagnets mounted to the support member, which may be activated and deactivated as needed to urge the wing member in a desired direction. Alternatively, a permanent magnet may interact with the magnetic field of the wing member to move the wing member.

Where multiple orthosonic lift generators support the wing member at any one time, control of the amplitude, frequency, phase and complexity of the oscillating air movement from each of the orthosonic lift generators using an electronic controller may selectably rotate and propel the wing member. A controller generates waveforms that are then amplified and supplied to the orthosonic lift generators. The controller may be informed by one or more sensors that detect the condition of the wing member. The sensors may detect parameters such as the location of the wing member on the support member, the separation distance between the wing and support surfaces at one or more locations, the static pressures at one or more locations between the surfaces, ambient conditions, and any other conditions useful to control the wing member. The controller may select the amplitude, frequency, phase and complexity of the signals provided to the orthosonic lift generators, and hence the amplitude, frequency phase and complexity of the oscillating air movement from each orthosonic lift generator, based on a command received by the controller and based on the conditions detected by the sensors.

If the controller receives a command to rotate the wing member, the controller may command a rotating phase among three or more orthosonic lift generators. The rotating phase may create a rotating air movement in the volume between the support and wing surfaces and the result in the counter-rotation of the wing member, thereby turning the wing member.

If the controller receives a command to move in a desired direction, the controller may increase the amplitude of the signal sent to some orthosonic lift generators and reduce the amplitude of the signal sent to others, causing the wing surface to tilt slightly in the desired direction. The slight tilt causes a component of the lift vector to urge the wing member in the desired direction.

Orientation and movement of the wing member also may be effected by any other suitable means, such as by one or more electric motors attached to the wing member and turning propellers or by wheels or continuous treads or tracks engaging the support surface.

The oscillating movement of air between the support and wing surfaces may be of any suitable frequency. The frequency may fall within the audio spectrum and may be perceived as sound, but frequencies outside of the audio spectrum also may be used and operation of the apparatus may be inaudible.

III. BRIEF DESCRIPTION OF THE DRAWINGS

FIG. 1 is a schematic side view of a prior art Bernoulli grip.

FIG. 2 is a top view of a wing member of the prior art Bernoulli grip.

FIG. 3 is an illustration of the generation of lift by AC air movement.

FIG. 4 is partial sectional view of a first example generating orthosonic lift.

FIG. 5 is a top view of the wing of the example of FIG. 4.

FIG. 6 is a detail sectional view of the port and volume of the example of FIG. 4.

FIG. 7 is a schematic partial sectional view of an embodiment having a port penetrating a wing surface.

FIG. 8 is a top view of the wing of FIG. 7.

FIG. 9 is a detail cutaway view of the port of FIG. 7.

FIG. 10 is a side view of an embodiment using an exciter attached to the wing member.

FIG. 11 is a side view of an embodiment using a piezoelectric material attached to the wing member.

FIG. 12 is a side view of an embodiment in which a piezoelectric material defines an integrated wing member and orthosonic lift generator.

FIG. 13 is a side view of an embodiment in which a piezoelectric material defines an integrated orthosonic lift generator and support surface.

FIG. 14 is a top view of a wing surface featuring an array of orthosonic lift generators.

FIG. 15 is a schematic diagram of a control system.

FIG. 16 is a side view of an array of piezoelectric orthosonic lift generators attached to the supporting surface.

FIG. 17 is a perspective view of a support member defining an axis of travel.

FIG. 18 is a perspective view of a support surface allowing travel by the wing member in two dimensions.

FIG. 19 is a side view of an example application.

FIG. 20 is a side view of an apparatus and a brake.

FIG. 21 is a side view of the brake in a deployed position.

FIG. 22 is a side view of a brake integral to the wing member.

IV. DESCRIPTION OF AN EMBODIMENT

FIGS. 1 and 2 illustrate a prior art Bernoulli grip utilizing DC air flow. From FIG. 1, the Bernoulli grip has a gripping member 2 used to support a wing member 4. A blower 6 propels air 8 through a port 10 and across the wing surface 14 of the wing member 4. From FIG. 2, the flow of air 8 on the wing surface 14 from the port 10 is radial. The static air pressure 12 on the wing surface 14 is reduced in proportion to the square of the velocity of the air 8, from the Bernoulli principle. Because the ambient air pressure 16 acting on the opposite side 18 of the wing member 4 is greater than the static air pressure 12 acting on the wing surface 14, the wing member 4 experiences a net force urging the wing member 4 toward the gripping member 2.

For the prior art Bernoulli grip of FIGS. 1 and 2, the momentum of the air 8 flowing from the blower 6 increases the local pressure on the wing surface 14 in the vicinity of the port 10, reducing the net air pressure differential across the wing member 4 and reducing the load that may be supported by wing member 4.

The Inventor had the original insight that because the difference in static pressure varies by the difference in the square of the air velocities under the Bernoulli principle, the direction of the movement of the air is unimportant to the resulting static pressure difference. The difference in direction of air flow is unimportant because the square of a negative number is a positive number. As an example, an air movement in a first direction of 2 ft/sec will result in a static pressure that is equal to the static pressure resulting from an air movement in the opposite second direction at −2 ft/sec. Since the relationship between static pressure and air velocity is instantaneous under the Bernoulli principle, AC movement of air in a first direction followed by movement in a second direction opposite to the first direction along the surface of a wing will generate lift, just as does DC air flow in only one direction.

FIG. 3 illustrates the principle of AC air 8 movement. A flat wing member 4 has a static air pressure 12 acting on a wing surface 14. The wing member 4 has an ambient air pressure 16 acting on the opposite side 18 of the wing member 4. In the absence of the movement of air 8, the pressures 12, 16 on the opposing sides 14, 18 of the wing member 4 are equal to each other and are the ambient air pressure 16, resulting in no net aerodynamic force acting on the wing member 4.

As shown by FIG. 3, if the air 8 adjacent to the wing surface 14 has a velocity in a first direction 20 parallel to the wing surface 14 of the wing member 4 while the air 9 adjacent to the opposite side 18 is still, then the static pressure 12 acting on the wing surface 14 of the wing member 4 is reduced proportional to the square of the velocity from the Bernoulli principle, while the ambient air pressure 16 acts on the bottom side 18 of the wing member 4, resulting in a net force acting on the wing member 4. If the wing surface 14 is oriented to face generally in an upward direction, then the net force is lift.

If the direction of movement of the air 8 adjacent to the wing surface 14 is reversed so that the air 8 has a velocity in a second direction 22 opposite to the first direction 20, then the static pressure 12 is still reduced proportional to the square of the velocity, while the ambient air pressure 16 continues to act on the opposite side 18 of the wing member 4. The result is a net force on the wing member 4. Again, if the wing surface 14 is oriented to face generally in an upward direction, then the net force is lift.

In short, the oscillating movement of air 8 along a wing surface 14 generates orthosonic lift.

FIGS. 4 and 5 and 6 illustrate a first apparatus. FIG. 4 is a partial section of the apparatus in side view. FIG. 5 is a top view of the wing member 4 and FIG. 6 is a detail section view of the port 10 and volume 32. A support member 24 has a support surface 26. The support member 24 may be in a fixed location. A port 10 penetrates the support surface 26. The port 10 is a duct conveying the AC movement of air 8 from an orthosonic lift generator 36 through the support surface 26 and into the volume 32. The volume 32 is defined by the space 34 between the support surface 26 and the wing surface 14. The orthosonic lift generator 36 is in fluid communication with the volume 32 through the port 10. In this instance, the orthosonic lift generator 36 comprises a loudspeaker 42. The loudspeaker comprises a transducer 43 and a diaphragm 45. The oscillator 38 generates an electrical signal of a selected frequency. The amplifier 40 increases the amplitude of the signal. The loudspeaker 42 converts the electrical energy of the amplified signal into mechanical energy; that is, into sound energy of the oscillating air 8. The air 8 oscillates at the selected frequency as illustrated by FIG. 5 radially about the port 10 and in the volume 32 between the support surface 26 and wing surface 14. The oscillating air 8 acts as described above for FIG. 3, resulting in a net orthosonic lift applied to the wing member 4.

FIGS. 7, 8 and 9 illustrate a second apparatus. FIG. 7 is a partial sectional side view of the apparatus. FIG. 8 is a top view of the wing surface 14 of the wing member 4. FIG. 9 is a detail section view of the wing member 4, port 10 and support member 24. For the second apparatus of FIGS. 7, 8 and 9, the orthosonic lift generator 36 is attached to the wing member 4 and the port 10 communicates through the wing surface 14. The orthosonic lift generator 36 is in fluid communication with the volume 32 through the port 10. The support member 24 has a support surface 26 that is oriented in a generally downward direction 44; that is, the support surface is generally normal to the direction of the pull of gravity with the support surface 26 appearing on the underside of the support member 24. The wing surface 14 is oriented in a generally upward direction opposite to the downward direction 44 of the support surface.

The orthosonic lift generator 36 is illustrated by FIG. 7 as a loudspeaker 42 that receives a signal from an oscillator 38 and through an amplifier 40. The loudspeaker 42 comprises a transducer 43 that is configured to vibrate a diaphragm 45. The orthosonic lift generator 36 operates in the manner described above relating to FIG. 4. A power supply 46 may be attached to the wing member 4 and power the oscillator 38 and amplifier 40, allowing the wing member 4 to move without constraint from cables connecting to an external power supply. Any suitable power supply may be used, such as a battery, fuel cell or capacitor. Alternatively the amplifier and oscillator may be powered from an external power supply by cable or by induction or by any other means known in the art to convey electrical power from one apparatus to another.

For orthosonic lift generators 36 that rely upon conveying oscillating air 8 to the volume 32, such as the loudspeaker 42 illustrated by FIGS. 4 and 7, a duct 10 transmits the energy of the oscillating air 8 from the orthosonic lift generator 36 to the volume 32. Orthosonic lift generators 36 comprising mechanical pumps such as a piston and cylinder also require use of a duct 10 to transmit the energy of the oscillating air to the volume 32. For orthosonic lift generators 36 that rely upon vibration of the wing surface 14 or the support surface 26 such as exciters 54 and piezoelectric materials 56, no duct 10 is required and the orthosonic lift generator 36 is mechanically attached to the wing member 4 or the support member 24, which conducts the vibration of the exciter 54 or piezoelectric material 56 to the wing surface 14 or the support surface 26.

When the apparatus of FIGS. 7, 8 and 9 is in operation, the orthosonic lift generator 36 generates an AC movement of air 8, which the port 10 communicates to the volume 32 defined by the space 34 between the wing surface 14 and the support surface 26. The AC movement of air 8 is deflected by the support surface 26, resulting in the air 8 oscillating parallel to the support surface 26 and the wing surface 14, as indicated by the double-ended arrows on FIGS. 7 and 9. The AC movement of the oscillating air 8 results in a reduced static air pressure 12 acting on the wing surface 14 compared to the ambient pressure 16 acting on the wing opposite side 18, resulting in a net orthosonic lift acting on the wing member 4. If the AC movement of the air 8 is of a correct frequency and an adequate amplitude, and if the wing surface area 50 and the corresponding support surface area 52 of the support surface 26 are adequately large, then the net orthosonic lift will be adequate to support the combined mass of the wing member 4, the orthosonic lift generator 36 and a payload 48 against the pull of gravity and to maintain the wing surface 14 in close proximity to the support surface 26.

Any suitable apparatus to generate an oscillating movement of air 8 in the volume 32 may serve as the orthosonic lift generator 36. Other orthosonic lift generators 36 are illustrated by FIGS. 10 through 12. FIG. 10 illustrates use of an exciter 54. The exciter 54 includes a transducer, as does a loudspeaker 42. Unlike a loudspeaker 42, the exciter 54 lacks a basket and diaphragm 45. When activated, the exciter 54 causes the object to which it is attached to vibrate. The exciter 54 can be attached directly to the wing member 4 and causes the wing member 4 to vibrate. The exciter 54 does not require use of a port 10. The vibration of the wing member 4 causes the air 8 within the volume 32 to oscillate parallel to the wing surface 14, reducing the static pressure 12 on the wing surface 14 and resulting in a net orthosonic lift acting on the wing member 4. The exciter 54 vibrates when supplied with an electrical signal from an oscillator 38 that is amplified by an amplifier 40, as for the loudspeaker 42 embodiments of FIGS. 4 through 6 and 7 through 9.

FIG. 11 illustrates an orthosonic lift generator 36 comprising piezoelectric material 56 attached to a wing member 4. An oscillating electrical signal is generated by an oscillator 38 and amplified by an amplifier 40. A piezoelectric material 56 vibrates in response to the amplified, oscillating current. The vibration of the piezoelectric material 56 causes the wing member 26 to vibrate, which causes the oscillating movement of air 8 within the volume 32 in a direction parallel to the wing surface 14, with the result as described above relating to FIG. 3.

FIG. 12 also illustrates the use of piezoelectric material 56 as the orthosonic lift generator 36, but in the instance of FIG. 12, the piezoelectric material 56 defines the wing member 4 and wing surface 14 to define an integrated orthosonic lift generator and wing member 60. In the embodiment of FIG. 12, the piezoelectric material 56 is a film such as polyvinylidine fluoride (PVDF) with a conductive coating (such as PZ-04 by Images SI Inc., 109 Woods of Arden Road, Staten Island, N.Y. 10312) and covering substantially the entire wing surface 14 to create an integrated orthosonic lift generator and wing 60. The entire integrated orthosonic lift generator and wing 60 vibrates when energized by the amplified oscillating electrical current, causing the air 8 within the volume 32 to oscillate parallel to the wing surface 14, resulting in net lift on the integrated orthosonic lift generator and wing 60, as described above relating to FIG. 3.

The orthosonic lift generators 36 discussed relating to FIGS. 10 through 12 have the advantage over the loudspeaker 42 alternatives of FIGS. 4-9 in that they lack a port 10. The area of the wing member 4 available to generate orthosonic lift therefore is larger than an otherwise identical wing member 4 with a port 10. In addition, the port 10 of the embodiments of FIGS. 4-9 is located at the region where the energy of the oscillating air 8 is greatest, so that there is no wing surface 14 at the location that provides maximum static pressure 12 reduction for the orthosonic lift generators of FIGS. 10 through 12.

FIG. 13 illustrates that a piezoelectric material 56 or an exciter 54 may be configured to vibrate the support surface 26. Alternatively, the piezoelectric material 56 may define an integrated orthosonic lift generator and support surface 62, as by composing the support surface 26 of PVDF film. An oscillator 38 generates an alternating signal, which is amplified by an amplifier 40 and supplied to the exciter 54 or piezoelectric material 56, 62 so that a desired region of the support surface 26 vibrates. The vibrating support surface 26 generates the oscillating movement of air 8 parallel to the wing surface 14, resulting in lift of the wing member 4.

FIGS. 14 though 16 illustrate an array 70 of orthosonic lift generators 36. In the embodiment of FIG. 14, four orthosonic lift generators 72, 74, 76, 78 are mounted to a wing member 4. Four ports 10 communicate through the wing surface 14. Each of the ports 10 communicates the oscillating movement of air 8 generated by one of the orthosonic lift generators 72, 74, 76, 78. The use of orthosonic lift generator arrays 70 as in FIG. 14 can provide distributed orthosonic lift with higher total power than is available from a single orthosonic lift generator 36. While FIG. 14 illustrates four ports 10 serving four orthosonic lift generators 72, 74, 76, 78, any desired number of orthosonic lift generators 36 and any desired number of ports 10 may be used. Although FIG. 14 illustrates use of orthosonic lift generators 72, 74, 76, 78 requiring ports 10, any of the orthosonic lift generators 36 described above may be used, including exciters 54 and piezoelectric material 56, that do not require ports 10.

For a wing member 4 having an orthosonic lift generator array 70 such as shown by FIG. 14, the speaker 42, exciter 54 and piezoelectric embodiments 56, 60 allow control of the amplitude, frequency, phase relations and complexity (wave shape) of the oscillating air movement from each orthosonic lift generator 36. If the four orthosonic lift generators 72, 74, 76, 78 are located equidistant from a central location and the orthosonic lift generators 72, 74, 76, 78 are configured to generate oscillating air movement of the same amplitude, frequency and phase, then a pressure node will occur at the location within the volume 32 central to the orthosonic lift generators 36. The pressure node is a location of oscillating air 8 pressure but with no or very little movement of the air 8. Because there is no movement of air parallel to the wing surface 14 at the pressure node, the location of the pressure node does not contribute desirably to the net lift on the wing member 4. A vent 64 may be provided at the location of the pressure node to relieve the oscillating high air 8 pressure and to reduce the mass of the wing member 30. Depending on the frequency and phase relationships, pressure nodes may occur at other locations on the wing surface 14. Vents 64 may be disposed at the location of the other pressure nodes to release air 8 pressure that does not contribute desirably to lift and to reduce wing member 4 mass.

FIG. 15 is a schematic diagram of a control system for an array 70 of two or more orthosonic lift generators 36. Although FIG. 15 illustrates two orthosonic lift generators, the control system may operate any number of amplifiers 40 and orthosonic lift generators 36. A controller 80 receives information from a sensor 82. The sensor 82 may be one of a plurality of sensors 82 that may detect any desired parameter. Those parameters may include the location of the wing member 4 on the support member 24, the space 34 between the wing surface 14 and the support surface 26 at one or more locations on the wing surface 14, the static pressure 12 in the volume 32 between the wing surface 14 and the support surface 26 at one or more locations, environmental conditions such as wind, unbalanced load conditions, ambient temperature and pressure, and any other parameters that may be useful for the operation of the wing member 4. The controller selects the amplitude, frequency, phase and complexity of the signal to each orthosonic lift generator 36 to achieve a desired condition of the wing member 4.

The controller 80 of FIG. 16 may compensate for an imbalanced payload 48 by detecting the space 34, the static air pressure 12, or both in the volume 32 between the wing surface 14 and the support surface 26 one or more locations on the wing surface 14 and by increasing the amplitude of the oscillating electrical signal supplied to the orthosonic lift generator 36 providing lift to the portion of the wing surface 14 that is detected to be pulling away from the support surface 26. The controller 80 may compensate for wind or induce locomotion by allowing the wing surface 14 to tilt slightly in the desired direction of travel by reducing the amplitude of the signal to the orthosonic lift generator(s) 36 corresponding to that direction or by increasing the amplitude of the signal corresponding to the orthosonic lift generator(s) 36 in the opposite direction. The net orthosonic lift acting on the tilted wing member 4 will have a component of that lift in the direction of the tilt, resulting in the wing member 4 being urged in the direction of the tilt.

As illustrated by FIGS. 14 and 16, the controller 80 may control the yaw of the wing member 4 by controlling the complexity and phase relationships of the oscillating air 8 at the ports 10 of the wing member 4 having three or more orthosonic lift generators 36. For the wing member 4 of FIG. 14 with four orthosonic lift generators 72, 74, 76 and 78 producing oscillating air 8 at the ports 10 of the same frequency, complexity and phase, the oscillating movement of the air 8 will generate orthosonic lift but will not apply a net force on the wing member 4 in any other direction. Modifying the signal to the orthosonic lift generators 36 so that the second 74, third 76 and fourth 78 orthosonic lift generators generate oscillating air movement 8 at the ports 10 with the phase shifted by +90°, +180°, and +270° respectively from the phase of the first orthosonic lift generator 72 may cause air 8 within the volume 32 to circulate in the counterclockwise direction, applying a yawing moment to the wing member 4 in the clockwise direction and causing the wing member 4 to rotate in the clockwise direction.

The control of amplitude, frequency, phase and complexity relationships within an array 70 of orthosonic lift generators 36 allows other possible operating options. The first and third orthosonic lift generators 72, 76 may be in phase while the second and fourth orthosonic lift generators 74, 78 are in phase with each other but 180° out of phase with the first and third orthosonic lift generators 72, 76. This would be conducive to AC vortigenic flow, a rapidly reversing vortex which may increase orthosonic lift without inducing rotation of the wing member 4.

Any other suitable mechanism to move and orient the wing member 4 may be used, such as propellers mounted to the wing member and rotated by electric motors, or directional compressed air jets propelling and orienting the wing member 4 by reaction to release of the compressed air. Other alternatives are motors turning wheels or tractor treads that engage the support surface 26.

FIG. 16 illustrates that the location of an array 70 of orthosonic lift generators 36 is not restricted to the wing member 24. The array 70 of orthosonic lift generators 36 as illustrated by FIG. 16 is mounted to the support member 24. Each of the orthosonic lift generators 36 is powered by a signal from the controller 80 that is amplified by an amplifier 40. The controller 80 is informed by a sensor 82 that may detect the location of the wing member 4. The controller 80 may activate the orthosonic lift generators 36 corresponding to the location of the wing member 4 and deactivate orthosonic lift generators 36 that do not correspond to the location of the wing member 4. The controller 80 may select and adjust the amplitude, frequency, phase relationships and complexity of the signal sent to each of the activated orthosonic lift generators 36 to control the yaw moment and direction of movement of the wing member 4. The orthosonic lift generators 36 of FIG. 17 are illustrated as composed of piezoelectric material 56, but any of the orthosonic lift generators 36 discussed above may be used.

FIGS. 17 and 18 illustrate that the support member 24 may allow movement of the wing member 4 along a single axis of travel 84 or may allow movement in two dimensions 86. From FIG. 17 and for movement along a single axis of travel 84 in either of two directions, the support surface 26 and mating wing surface 14 are configured to be substantially flat in one dimension but to define a bend or curve in another dimension. The dimension that is substantially flat defines the axis of travel 84. From FIG. 18, mating support surface 26 and wing surface 14 that are substantially flat allow travel by the wing surface in two dimensions 86 on the support surface 26.

FIG. 19 illustrates an application of the Invention. A wing surface 14 of a wing member 4 is attached to a plurality of exciters 54. A payload 48 supported by the wing member 4 includes a surveillance camera 88, a radio transceiver 90, controller 80 and sensors 82 (FIG. 16). The radio transceiver 90 receives commands from a remote operator. The commands are executed by the controller 80. The controller 80 detects the condition of the wing member 4 using the sensors 82 and adjusts the phase, amplitude and complexity of the electrical signals that are fed by the controller 80 to amplifiers 40 and then to the orthosonic lift generators 36 to control the orientation, location and direction of movement of the wing member 4, as described above, to achieve the command. The camera 88 collects surveillance images and the images are transmitted to a receiver by the radio transceiver 90.

In contrast to conventional airfoils, the flat wings surfaces illustrated by FIGS. 3-19 have no camber and zero angle of attack, resulting in minimal drag, turbulence or possibility of stall. In addition, there is no flow of air 9 beneath the wing member 4 when the wing member 4 is stationary to develop an undesirable downward lift component. Orthosonic lift is inherently efficient and the controller 80 can produce changes in amplitude, lift, phase and complexity much faster than systems relying on propellers, turbines, rockets or flaps. As orthosonic lift does not require forward motion, it is inherently well suited for hovering. Unlike helicopters, hovering with orthosonic lift does not require counter-rotational measures such as a tail rotor to compensate for torque reaction from a main rotor. Compared to aerodynamic lift from conventional engines, orthosonic lift is not noisy and when inaudible sound frequencies are employed, can be silent. Orthosonic lift generators 36 employed for orthosonic lift can be energy efficient, have very little heat signature and being electric, release no exhaust fumes. The orthosonic lift generators 36 are also relatively simple, reliable and low maintenance, often having only one moving part. This is particularly evident for example with a PVDF film, which may act at once as both wing surface 14 and orthosonic lift generator 36 in an integrated wing member and orthosonic lift generator 60 or an integrated support member and orthosonic lift generator 62.

FIGS. 20, 21 and 22 illustrate operation of the wing member 4 on a support surface 26 where the axis of travel (FIG. 17) or the two dimensions of travel 86 (FIG. 18) are not horizontal. Because of the low friction between the wing surface 14 and the support surface 26, the force of gravity will urge the wing member 4 to the lowest location of the support surface 26. FIGS. 20 and 21 illustrate a vertically-oriented support surface 26 and a wing member 4 having a brake 92 and a friction surface 94. The friction surface 94 may be any suitable material that provides an adequate frictional engagement with the support surface, such as grit, bristles, ridges, or dimples. In the apparatus of FIG. 20, the wing member 14 is not in orthosonic engagement with the upport surface 26. The brake 92 and friction surface 94 are shown in a non-deployed position and do not engage the support surface 26.

FIG. 21 shows the wing member 14 of FIG. 20 in a deployed position on a vertically-oriented support surface 26. The exciter 54 is activated by oscillator 38 and amplifier 40. Vibrating wing surface 14 causes the air 8 between the wing surface 14 and the support surface 26 to oscillate and urges the wing surface 14 toward the support surface 26. Friction surface 94 of brake 92 engages the support surface 26, retaining wing member 4 in position on support member 24 and preventing wing member 4 from falling with respect to the support member 4. Brake 92 may be resilient, such as a resilient foam, polymer, spring or fabric. The brake 92 of FIGS. 20 and 21 is resilient and is compressed when the brake 92 engages the support surface 26. The brake may define an electrically-powered wheel or continuous track, both preventing sliding movement of the wing member 4 with respect to the support surface 26 and allowing an operator to move the wing member 4 with respect to the support surface 26. The gripping force of the friction surface 94 against the support surface 26 may be adjusted by selecting an appropriate frequency and amplitude of the signal to the exciter 54, determining the orthosonic force with which the wing member 4 presses the friction surface 94 against the support surface 26.

FIG. 22 illustrates a wing member 4 orthosonically engaging a vertical support surface 26. The friction surface 94 is incorporated into the wing surface 14. The operation of the embodiment of FIG. 22 is otherwise identical to that of FIGS. 20 and 21. The use of the brake 92 having a friction surface 94 allows the wing member 4 to be supported at any desired location on a support surface 26 defined by a vertical wall, by a sloping ceiling, or by any support surface 26 having any orientation.

Experimental Results

Several experiments were conducted to investigate orthosonic lift by deflection. The following is a brief summary of some of those experiments:

1. An audio speaker using a neodymium-iron-boron (NIB) magnet structure (Tang Band, W3-881 SI, 3 inch, 126 grams) acting as the orthosonic lift generator 36 was attached with silicone caulk to a six inch diameter wing member 4 cut from cardboard having a 2.5 inch central port 10 in an arrangement similar to FIG. 7. A flat, horizontal, 20×10×½ inch, plywood board mounted on two wood support panels acted as the support member 24. The speaker 42 and wing member 4 (total mass 138 grams) was driven by a 15 watt, 83 Hz sine wave from separate equipment. When held nearly touching the support member surface 26, the device readily suspended with orthosonic lift by radial deflection. It was movable about the entire support surface 26 with some friction relating to higher applied power. When power was cut, the device dropped from the support member 24.

2. In a similar experiment and also referring to FIG. 7, a smaller NIB speaker 42 (Vifa TC6FC00-04, 2 inch, 78 grams), acting as orthosonic lift generator 36, was affixed to a 4.5 inch diameter cardboard wing member 4 cut from a file folder. The wing member 4 was provided a central 1.5 inch port 10. In addition, a weight was affixed to the bottom of the speaker 42, representing a battery and circuitry (power supply 46, oscillator 38 and amplifier 40) to provide an amplified sine wave. The total mass of the speaker 42, wing member 4 and weight was 133 grams. At 130 Hz and 5 watts, the device suspended from the support member 24 when brought in close proximity to the support surface 26 and could be moved about it. At less than 5 watts, the device dropped.

3. Referring to FIG. 10, a light weight exciter 54 (HiWave HIAX19C01-8, 1.5 inch diameter, 10 grams) served as the orthosonic lift generator 36. The exciter 54 was mounted to a six inch diameter wing member 4 cut from a file folder. The wing member 4 had no port 10. The wing member 4 served the double role of diaphragm 45 and wing member 4. The wing member 4 and exciter 54 together had a mass of 34.3 grams. When a 240 Hz sine wave was supplied at 0.6 watts through 18 gauge wire, the wing member 4 and exciter 54 was found to easily suspend under a glass support member 24. The very thin layer of oscillating air on the smooth glass surface 26 allowed nearly frictionless lateral motion of the wing member 4 and exciter 54, much like a puck on an air hockey table. Upon trying to pull the active device away from the support member 24, considerable suction-like lifting capacity was felt. When the power was switched off, the device dropped off.

4. In a similar experiment and with reference to FIG. 10, a small exciter 54 (HiWave, HIAX11C005-32, 0.4 inch diameter, 5 grams) was coupled to a 3 inch wing member 4 of clear flexible plastic cut from a freezer bag. The total mass was 5.3 grams and when driven through light (22 gauge) transformer wire with a 700 Hz sine wave at ¼ watt, suspended below the glass support member 24. From above the glass, a small magnet 58, was used to repel the NIB magnet in the exciter 54 with very little effort.

5. With reference to FIG. 11, a thin piezoelectric material 56 (Murata, 20 mm diameter, 0.4 mm thick, 1600 nF, 2.2 grams), commonly used as a sound pickup for guitars, was used as the orthosonic lift generator 36. A 3-inch disk cut from a page of a magazine served as the wing member 4. The centers of the wing member 4 and piezoelectric material 56 were attached by a small drop of silicone caulk. When driven through light (22 gauge) wire with a 1,450 Hz sine wave at 12.5 volts (RMS), this device also suspended when placed up against the glass deflector.

LIST OF NUMBERED ELEMENTS

The following is a list of the numbered elements:
gripping member 2
wing member 4
blower 6
moving air 8
ambient air 9
port 10
static pressure 12
wing surface 14
ambient pressure 16
wing side 18 opposite to the wing surface
a first direction 20
a second direction 22
a support member 24
a support surface 26
a volume 32
a space 34
an orthosonic lift generator 36
oscillator 38
amplifier 40
loudspeaker 42
transducer 43
downward direction (direction of the pull of gravity) 44
diaphragm 45
power supply 46
payload 48
a wing surface area 50
a support surface area 52 an exciter 54
a piezoelectric material 56
magnet 58
an integrated wing member and orthosonic lift generator 60
an integrated support surface and orthosonic lift generator 62
a vent 64
an array of orthosonic lift generators 70
first orthosonic lift generator 72
second orthosonic lift generator 74
third orthosonic lift generator 76
fourth orthosonic lift generator 78
controller 80
sensor 82
an axis of travel 84
two dimensions 86
camera 88
radio transceiver 90
brake 92
friction surface 94

I claim:

1. A method of providing orthosonic lift, the method comprising;
   a. providing a support surface;
   b. providing a wing surface, said wing surface being attached to a wing member, said wing surface being movable with respect to said support surface, said wing surface generally corresponding to said support surface;
   c. placing said wing surface in a close proximity to said support surface with said support surface facing generally downward and said wing surface facing generally upward, said support surface and said wing surface defining a volume, said volume containing an air;
   d. actuating an orthosonic lift generator, said orthosonic lift generator being attached to said wing member, said orthosonic lift generator providing an oscillating movement of said air at a location within said volume, said oscillating movement of said air at said location alternating between said movement in a first direction and in a second direction, said second direction being opposite to said first direction, said first and said second directions being generally parallel to said wing surface and said support surface, whereby said oscillating movement of said air in said volume results in a static air pressure on said wing surface that is less than an ambient air pressure, said static air pressure and said ambient pressure defining a force acting on said wing, said force being sufficient to support said wing against a pull of gravity.

2. The method of claim 1 wherein said orthosonic lift generator is in fluid communication with said air within said volume through a port penetrating said wing surface.

3. The method of claim 1 wherein said orthosonic lift generator is not in fluid communication with said air within said volume through a port penetrating said wing surface.

4. The method of claim 1 wherein said orthosonic lift generator is selected from a list consisting of a transducer configured to vibrate a diaphragm, an exciter configured for vibration and a piezoelectric material configured to deform in response to an applied electrical voltage.

5. The method of claim 1 wherein said wing member is composed of a piezoelectric material that defines an integrated wing member and orthosonic lift generator.

6. The method of claim 1 wherein said support surface defines an axis of travel, said wing surface conforming generally to said support surface, whereby said wing member may move along said axis of travel.

7. The method of claim 1 wherein said support surface is substantially flat, said wing surface conforming generally to said support surface, whereby said wing member may move in two dimensions with respect to said support surface.

* * * * *